US009168786B2

(12) United States Patent
Schlee et al.

(10) Patent No.: US 9,168,786 B2
(45) Date of Patent: Oct. 27, 2015

(54) MOBILE ROBOT

(71) Applicant: HELICAL ROBOTICS, LLC, Oregon, WI (US)

(72) Inventors: Keith L. Schlee, Oregon, WI (US); Bruce A. Schlee, Oregon, WI (US)

(73) Assignee: Helical Robotics, LLC, Oregon, WI (US)

( * ) Notice: Subject to any disclaimer, the term of this patent is extended or adjusted under 35 U.S.C. 154(b) by 32 days.

(21) Appl. No.: 13/690,951

(22) Filed: Nov. 30, 2012

(65) Prior Publication Data
US 2013/0140801 A1  Jun. 6, 2013

Related U.S. Application Data

(60) Provisional application No. 61/566,104, filed on Dec. 2, 2011, provisional application No. 61/703,656, filed on Sep. 20, 2012.

(51) Int. Cl.
*B62D 11/00* (2006.01)
*B60B 39/00* (2006.01)
*B62D 57/024* (2006.01)

(52) U.S. Cl.
CPC .............. *B60B 39/00* (2013.01); *B62D 57/024* (2013.01)

(58) Field of Classification Search
CPC .. B60B 19/003; B60B 19/125; B62D 57/024; Y10S 901/01; Y10S 180/901
USPC ..................... 180/6.2, 6.48, 5, 6.66
See application file for complete search history.

(56) References Cited

U.S. PATENT DOCUMENTS

| 455,088 | A | | 1/1891 | Sell et al. |
| 2,467,306 | A | | 4/1949 | Habig |
| 3,540,151 | A | | 11/1970 | Ishida |
| 3,746,112 | A | * | 7/1973 | Ilon ............................ 180/6.2 |
| 3,930,404 | A | | 1/1976 | Ryden, Jr. |
| 3,955,425 | A | | 5/1976 | Corneau |

(Continued)

FOREIGN PATENT DOCUMENTS

| CN | 101131150 A | 2/2008 |
| CN | 101704241 A | 5/2010 |

(Continued)

OTHER PUBLICATIONS

International Search Report and Written Opinion for International Application No. PCT/US2012/067350, mailed Jun. 7, 2013, 17 pages.

(Continued)

*Primary Examiner* — J. Allen Shriver, II
*Assistant Examiner* — Bryan Evans
(74) *Attorney, Agent, or Firm* — Fredrikson & Byron, P.A.

(57) ABSTRACT

A mobile robot configured to be widely versatile in its use. For example, the mobile robot can be configured for being used on a wide assortment of surfaces, regardless of the orientation and/or shape of the surfaces. Alternatively or in combination, the mobile robot can be configured for effective and efficient movement on the surfaces it traverses. In some cases, the mobile robot is configured with two or more component units. In some cases, the component units are configured with magnets and a control system for orientating the magnets. In some cases, one or more component couplings join the component units. In some cases, the mobile unit is configured with Mecanum wheels.

18 Claims, 18 Drawing Sheets

(56) References Cited

U.S. PATENT DOCUMENTS

| | | |
|---|---|---|
| 4,027,527 A | 6/1977 | Bennett et al. |
| 4,041,773 A | 8/1977 | Hauldren et al. |
| 4,196,607 A | 4/1980 | Youtsey et al. |
| 4,242,036 A | 12/1980 | Slaght |
| 4,492,115 A | 1/1985 | Kahil et al. |
| 4,510,447 A | 4/1985 | Moyer |
| 4,674,585 A | 6/1987 | Barlow et al. |
| 4,813,906 A | 3/1989 | Matsuyama et al. |
| 4,890,567 A | 1/1990 | Caduff |
| 5,809,099 A | 9/1998 | Kim et al. |
| 5,852,984 A | 12/1998 | Matsuyama et al. |
| 6,234,866 B1 | 5/2001 | Ben-Yakar et al. |
| 6,564,815 B2 | 5/2003 | McGuire |
| 6,792,335 B2 | 9/2004 | Ross et al. |
| 6,870,343 B2 | 3/2005 | Borenstein et al. |
| 7,137,465 B1 | 11/2006 | Kerrebrock et al. |
| 7,363,994 B1 | 4/2008 | DeFazio et al. |
| 7,387,179 B2 | 6/2008 | Anhalt et al. |
| 7,400,108 B2 | 7/2008 | Minor et al. |
| 7,568,536 B2 | 8/2009 | Yu et al. |
| 7,699,066 B2 | 4/2010 | Andersen et al. |
| 7,934,575 B2 | 5/2011 | Waibel et al. |
| 8,851,211 B2 | 10/2014 | Schlee et al. |
| 2002/0036108 A1* | 3/2002 | Jeswine et al. ............ 180/164 |
| 2007/0080001 A1 | 4/2007 | Beck et al. |
| 2008/0164079 A1 | 7/2008 | Jacobsen |
| 2009/0025988 A1 | 1/2009 | Jacobsen et al. |
| 2009/0030562 A1 | 1/2009 | Jacobsen et al. |
| 2010/0212983 A1 | 8/2010 | Lama |
| 2011/0050374 A1 | 3/2011 | Dvorak |
| 2012/0006352 A1 | 1/2012 | Holappa et al. |
| 2012/0103705 A1 | 5/2012 | Schlee |
| 2012/0138105 A1 | 6/2012 | Perales |
| 2013/0024067 A1* | 1/2013 | Troy et al. ............ 701/36 |

FOREIGN PATENT DOCUMENTS

| | | |
|---|---|---|
| CN | 201633804 U | 11/2010 |
| DE | 20021463 U1 | 4/2001 |
| EP | 0878381 A1 | 11/1998 |
| EP | 1886904 A2 | 2/2008 |
| EP | 2431977 A2 | 3/2012 |
| FR | 2190087 | 1/1974 |
| GB | 2471204 A | 12/2010 |
| JP | H0494778 A | 3/1992 |
| JP | 10221256 A | 8/1998 |
| JP | 2004359149 A | 12/2004 |
| KR | 1020050017724 A | 2/2005 |
| WO | 2010138774 A1 | 12/2010 |

OTHER PUBLICATIONS

Schlee, Keith, "Wind Alrfoil/Tower Robot Technical Summary," retrieved from http://www.helicalrobotics.com/sites/default/files/Robot%20Technical%20Summary%20for%20AWEA%205-22-11.pdf on Sep. 9, 2014, authored May 22, 2011, 13 pages.

* cited by examiner

MOBILE ROBOT

CROSS-REFERENCES

This application claims the benefit of both U.S. Provisional Application No. 61/566,104, filed Dec. 2, 2011, and U.S. Provisional Application No. 61/703,656, filed Sep. 20, 2012, the contents of which are hereby incorporated by reference in their respective entireties.

FIELD OF THE INVENTION

The present invention relates to mobile robots.

SUMMARY OF THE INVENTION

Embodiments of the present invention involve a mobile robot configured to be widely versatile in its use. For example, the mobile robot can be configured for being used on a wide assortment of surfaces, regardless of the orientation and/or shape of the surfaces. Alternatively or in combination, the mobile robot can be configured for effective and efficient movement on the surfaces it traverses.

In certain embodiments, the mobile robot is configured to be used on a surface, regardless of the surface's orientation to the ground or floor. For example, when designed for use on ferromagnetic surfaces, the robot can include magnets and orientation control structure therefor. In such cases, the magnets are operatively coupled to the robot so as to be held above, i.e., having no direct contact with, the ferromagnetic surfaces, yet the field strengths of the magnets are sufficient to hold the robot and its payload against the surfaces without risk of falling therefrom. In some cases, the magnets are operably coupled to outer ends of the robot so as to keep at a minimum one or more of the robot frame's clearance from the surfaces it traverses, the robot's center of gravity, and the robot's overall profile. In some cases, the magnets are selectively adjustable in two or more dimensions in relation to the ferromagnetic surfaces. In some cases, the magnets are operably coupled to opposing ends of the robot. In some cases, the magnets are externally offset from component units of the robot. In some cases, the mobile robot is configurable to have a ganged configuration in conjunction with using the magnets and their orientation control structure.

In certain embodiments, the mobile robot is configured to be used on a surface, regardless of the surface's shape. For example, when used on curved surfaces, the robot can include two or more component units that are operatively joined together via one or more linkages. In such cases, the linkages are configured to join two component units, yet permit the units to shift in relation to each other so as to adapt to the shape of the surfaces on which the robot is used. Consequently, the mobile robot can be self-adapting to any of a variety of surface shapes so contact between the robot and surfaces is sufficiently maintained during the robot's use. In some cases, the one or more linkages are located external to component units. In some cases, the one or more linkages are operably coupled to outer sides of two of the component units. In some cases, the one or more linkages are located along a midline of the robot, being located apart from wheel axles of the robot. In some cases, the one or more linkages are configured for at least pivoting one of the component units in relation to the other component unit.

In certain embodiments, the mobile robot is configured to have both effective and efficient movement on a surface. For example, the robot can include omni-directional wheels to facilitate movement of the robot in any direction. In such cases, the robot would not dictate steering assembly, which is generally limited to moving only certain wheels for navigation. To the contrary, each of the wheels can be independently controlled, enabling the robot's drive type to be versatile and the robot's change of direction capability to be more precise and immediate as opposed to using conventional wheels with steering mechanism. In one case, the robot can be configured with Mecanum wheels.

These and other aspects and features of the invention will be more fully understood and appreciated by reference to the appended drawings and the description of the preferred embodiments.

BRIEF DESCRIPTION OF THE DRAWINGS

FIG. 12a is an enlarged perspective view of one joint area between the component units of the robot of FIG. 12.

DESCRIPTION OF THE PREFERRED EMBODIMENTS

Figure 1:
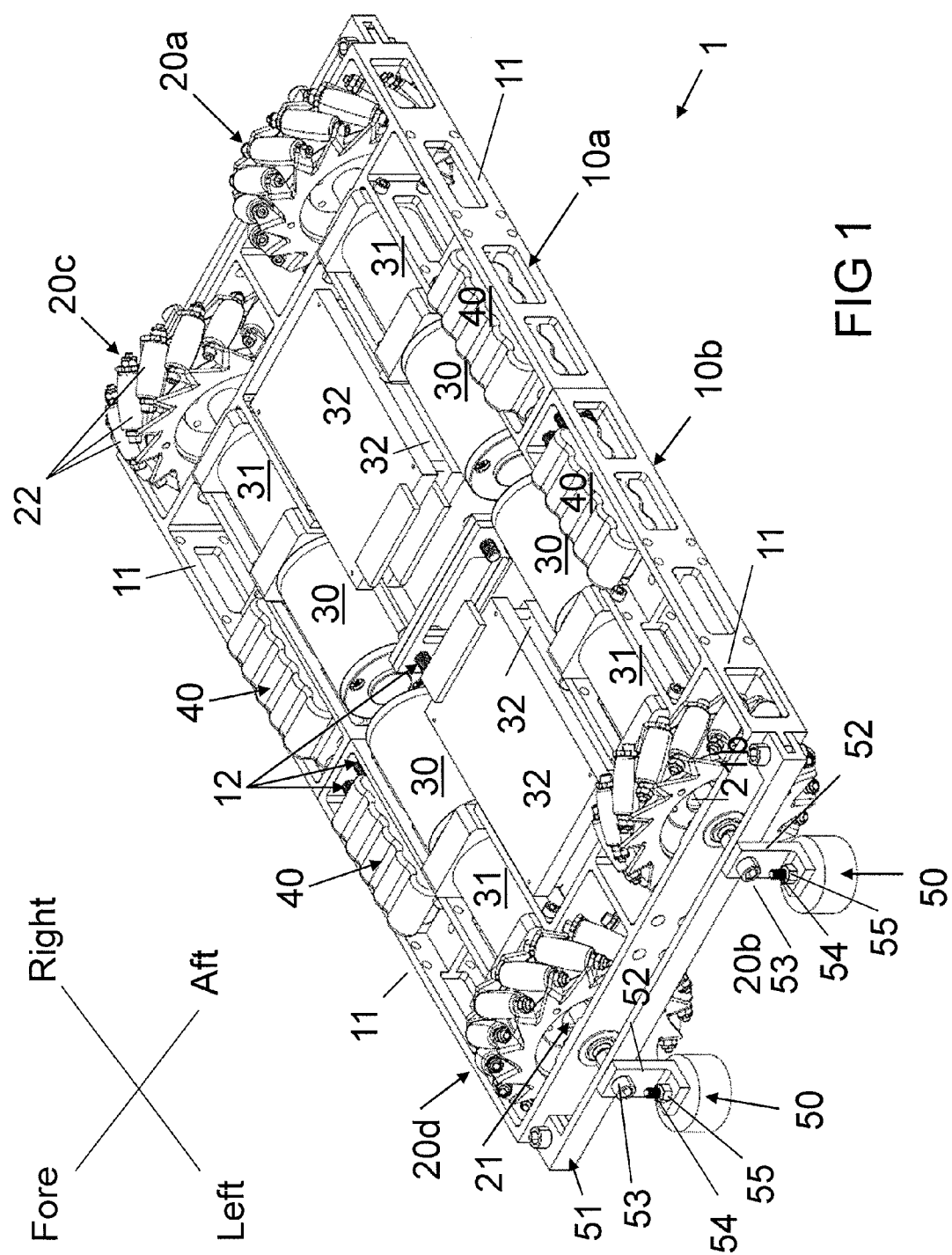
FIG. 1 is a perspective view of a mobile robot with locked component units in accordance with certain embodiments of the invention.

FIG. 1 illustrates one exemplary design of a mobile robot 1 in accordance with certain embodiments of the invention. Mobile robots of the invention, such as the robot 1 of FIG. 1, have a framework, wherein the framework includes one or more paired component units. For example, as shown, the mobile robot 1 includes a single pair of component units, unit 10a and unit 10b. The components units 10a and 10b are joined together by component couplings 12. As illustrated, the couplings 12 can involve threaded members threaded through abutting faces of adjacent frames (or chasses) 11 for the two component units 10a and 10b so as to lock the units 10a, 10b together. However, as noted above, the invention should not be limited to couplings for locking the component units together. For example, in alternate embodiments (as described later with reference to FIGS. 6, 7, and 12-14), the couplings can be substituted with linkages. Such linkages allow for the joined component units to shift in relation to each other so that contact between the units (e.g., wheels thereof) and the surfaces on which they traverse can be maintained, regardless of the shape of, or irregularities present on, such surfaces.

In certain embodiments, as shown, each component unit 10a and 10b has its own frame (or chassis) 11. However, if the component units 10a, 10b are intended to be locked together via the component couplings 12, embodiments of the mobile robot could alternately employ a single frame for the units 10a, 10b. In certain embodiments, each component unit 10a and 10b carries a pair of Mecanum wheels 20a, 20c and 20b and 20d, respectively. However, as described above, Mecanum wheels represent just one of a variety of omni-directional wheels that can be used with mobile robots of the invention. In the case of the Mechanum wheels 20a-20d, they can be rotatably mounted to the chassis 11 via wheel axles 21 and can be independently driven. For example, in certain embodiments as shown, each wheel is driven by its own drive motor 30 via a gearbox 31. Further, each motor 30 can be independently controlled, such as by a controller 32. This independent control, among other factors, enables both effective and efficient movement of the robot 1 on surfaces. As shown, power packs (e.g., batteries) 40 of sufficient capacity can be mounted on one or more of the frames 11 to provide power to the motors 30 and the motor controllers 32.

In certain embodiments, the mobile robot 1 includes magnets 50. However, it should be understood that magnets represent but one mechanism by which mobile robots of the invention can be held to surfaces (most notably, ferromagnetic surfaces) on which the robots are used, regardless of orientation of these surfaces to the ground or the floor. To that end, any mechanism acting to pull the robot toward, and hold the robot against, its working surface (so as to counteract gravitational pull as applicable) would represent another of the mechanisms. For example, such mechanisms (used instead of or in combination with magnetic force) would include vacuum force (as exemplified in FIG. 15) and clamping pressure (as exemplified in the embodiments described in U.S. Ser. No. 13/247,257, the disclosure of which is incorporated herein by reference, in relevant part). Even further, another mechanism may involve using differential force (e.g., via a pump, if the robot were configured for underwater applications).

In using magnets to provide such holding force, the magnets 50 and an orientation control structure therefor are used. In certain embodiments, as shown, the magnets 50 are operably coupled to outer ends of the robot 1. In some embodiments, the magnets 50 can be operably coupled to outer end surfaces of the robot 1; however, the invention should not be limited to such. Instead, one aim of embodiments of the invention is to have the magnets 50 and their orientation control structure (as embodied below) located external to the component units 10a, 10b. As shown, the magnets 50 and orientation control structure are provided adjacent to (or to the sides of) the units 10a, 10b. Such a configuration has many benefits. For example, the magnets 50 and the orientation control structure can be incorporated with little to no modification being necessary for the design of the component units 10a, 10b. In addition, such configuration of the magnets 50 and orientation control structure enable one or more of the robot frame's clearance from the surfaces it traverses, the robot's center of gravity, and the robot's overall profile, to be kept at a minimum.

In certain embodiments, the magnets 50 are operably coupled to opposing ends of the robot 1. In particular, as shown, each magnet 50 is operatively coupled to the chassis 11 of its corresponding component unit 10a, 10b. While FIG. 1 depicts a pair of the magnets 50 being operably coupled to each of the component units 10a, 10b, it should be understood that a single longitudinally-shaped magnet could instead be used with each unit 10a, 10b, or alternatively, magnet quantities of two or more could be used.

Figure 2:
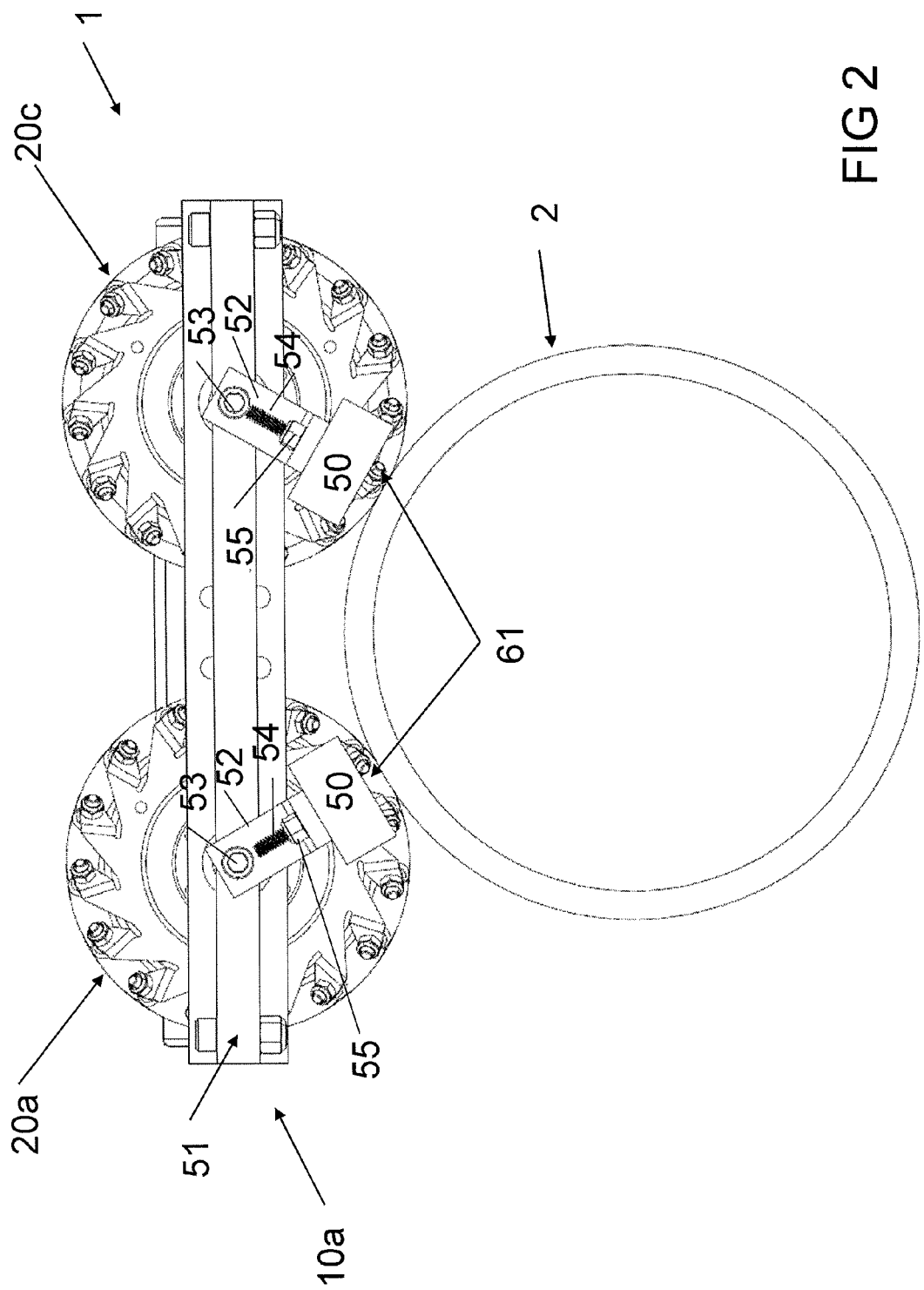
FIG. 2 is an elevation view of one side of the robot of FIG. 1, wherein the robot is shown on an object with curved surface.

The embodied structure (the orientation control structure) by which the magnets 50 are operably coupled to mobile robots of the invention avail selective adjustment of the magnets' positioning to the surfaces on which the robots are used. The orientation control structure involves a plurality of components. For example, as shown in FIG. 1, each magnet 50 is operably coupled to the chassis 11 via a pivot member 52. In certain embodiments, each pivot member 52 can be pivotally mounted to a pivot axle 53, which can be concentric with the wheel axle 21. Thus, in such cases as shown, the magnets 50 can be externally offset from the wheels 20a-20d of the robot 1. As shown for the robot 1 of FIG. 1, in certain embodiments, each pivot member 52 is generally shown as an L-shaped bracket, the leg of which is pivotally mounted on the pivot axle 53 and the base of which is operatively coupled to the magnet 50 via fasteners. For instance, as shown in FIGS. 1 and 2, a threaded magnet adjustment screw 54 can be secured to each magnet 50, with the screw 54 being coupled to the base of the pivot member 52 using a magnet adjustment nut 55. As shown, in certain embodiments, inward axial movement of the pivot members 52 (and consequently, the magnets 50) can be prevented via a magnet mounting bracket 51 which abuts a portion of the leg of the pivot member 52. In such case, the bracket 51 can be either integrally formed to the chassis 11, or operably coupled to the chassis 11 as shown.

With continued reference to FIG. 2, in certain embodiments, the magnets 50 are selectively adjustable in at least two dimensions in relation to the surface 2 on which it traverses. For example, as shown, the magnets 50 are selectively adjustable, both in orientation angle and clearance distance in relation to the surface 2. Consequently, the magnets 50 can be adapted to a variety of surfaces, from those with irregularities across their extent to those that are non-planar, such as being curved. Regarding orientation angle, each magnet 50 is adjustable via pivoting of the pivot member 52 about the pivot axle 53. Regarding clearance distance, the magnets 50 are adjustable (e.g., via the use of washers used with the adjustment screws 54) with regard to their position above (i.e., not contacting) the surface 2 on which the robot 1 is traversing. The clearance distance defines a gap 61 between the corresponding magnet 50 and such surface 2. Such gap 61 (or clearance) between the magnets 50 and the surface being traversed, prevents friction there between while maximizing the clinging power provided by the magnets. This ensures that the mobile robot 1 does not fall from the surface (and prevents slippage thereon), regardless of the surface's orientation. The magnets 50 can be passive, such as neodymium, or active, such as electromagnets. Regardless of type, passive or active, the magnets 50 can be effectively used with the mobile robots of the invention, i.e., supported at a distance (greater than zero) from work surface to eliminate friction between the magnets 50 and surface 2, yet provide sufficient force for holding the robots to the surface.

Figure 3:
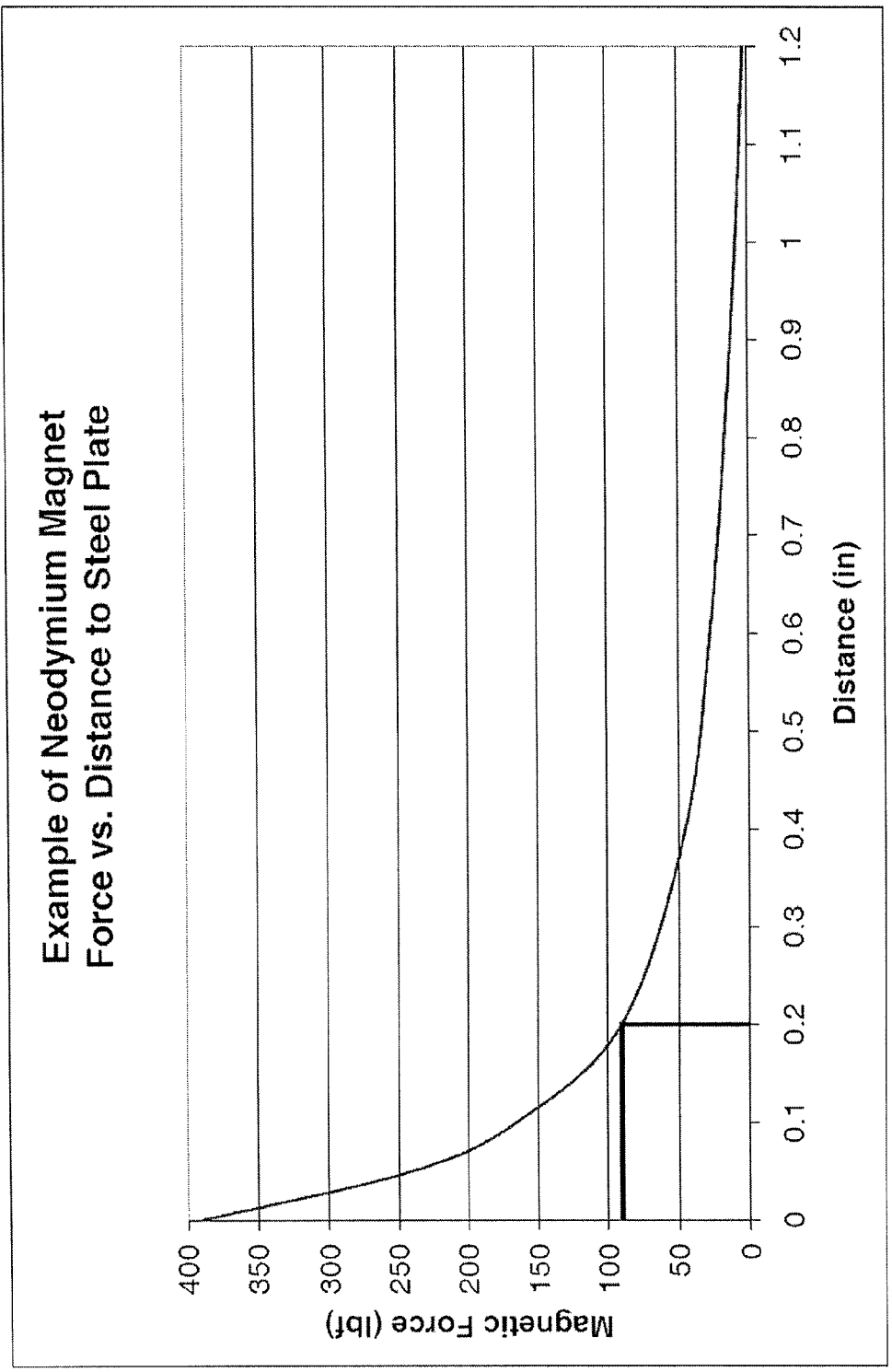
FIG. 3 is a graph showing force vs. distance relationship for magnet of neodymium material in relation to a ferrous surface.

FIG. 3 shows the relationship of magnet force vs. distance for a generic neodymium magnet. The amount of magnetic force required for mobile robots of the invention to operate on surfaces they traverse, regardless of orientation, is defined by equation (1) below:

$$F_{Mreq} \geq \frac{M_p}{\mu_{mw}} \quad (1)$$

Where:
$F_{Mreq}$=Magnetic Force Required for Adhesion to Ferrous Surface
$M_p$=Platform Mass
$\mu_{mw}$=Mecanum Wheel Coefficient of Friction The magnetic force is additive, meaning that each magnet 50 of the mobile robot contributes to its overall lifting capacity. For example, looking to FIG. 3, if each magnet is held 0.2" off the surface, the corresponding magnetic force ($F_{Mreq}$) generated by each magnet is approximately 90 lb (according to the FIG. 3 curve). With reference to the mobile robot 1 of FIG. 1, this force would be multiplied by 4 in light of the four magnets, totaling 360 lbs. Regarding this magnetic force, it should be appreciated how significant a role the gap 61 (or clearance) between the magnets 50 and the surfaces the robot 1 traverses plays in the intended functioning of the robot 1. To that end, the adjustability of the magnets 50 with regard to the traversed surfaces, made possible via the orientation control structure, enables such gap 61 to be maintained.

Continuing use of equation (1) and the variables provided above, if wheels, such as the Mecanum wheels 20a-20d, are used and have coefficient of friction ($\mu_{mw}$) of 0.35, the maximum lifting capacity ($M_p$) of the mobile robot 1 would be 126 lb. As a result, such robot 1 can climb or descend surfaces, even when inverted (e.g., when traversing bottoms of elevated surfaces), without falling therefrom as long as the lifting conditions of equation (1) are met. As noted above, the adjustability of the magnets 50 enables their clearance (i.e., by the gap 61) with respect to the surface being traversed to be maintained, even on a cylindrical surface 2 as shown in FIG. 2. The same would hold true for movement over any other non-planar or uneven surfaces.

Figure 7:
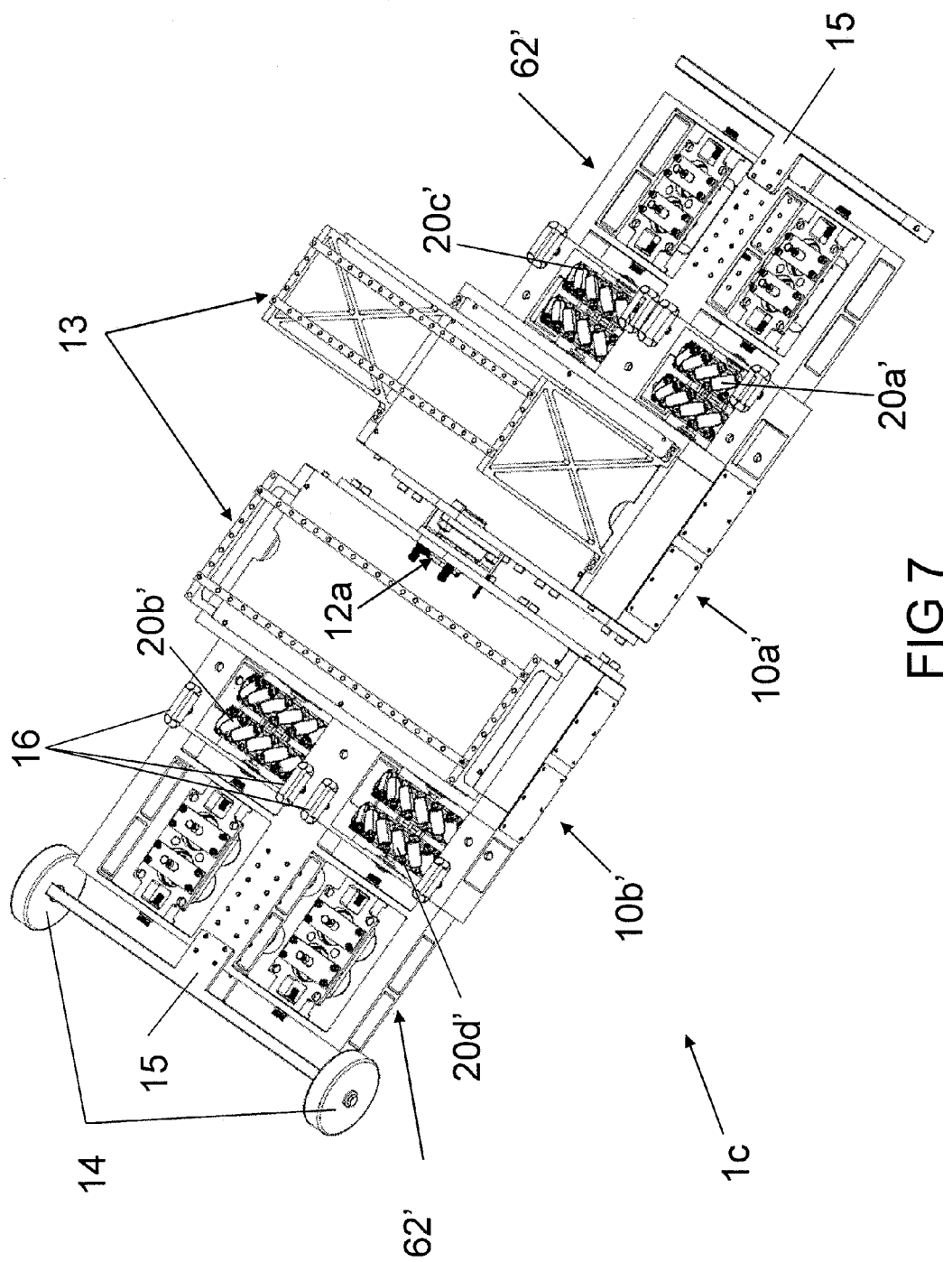
FIG. 7 is a perspective view of a mobile robot stemming from the robots of FIGS. 4 and 6 in accordance with certain embodiments of the invention.

One purpose of mobile robots of the present invention is for them to carry a payload (e.g., on exemplary payload brackets 13 as shown in FIG. 7). Thus, in using equation (1), the payload capacity can be approximated in using equation (2) shown below:

$$M_{PL} = \Sigma F_M * \mu_{mw} M_p \quad (2)$$

Where:
$\Sigma F_M = F_{M1} + F_{M2} + F_{Mx} \ldots$ =Sum of Magnetic Force
$M_{PL}$=Payload Mass Again using values from the example described above ($\Sigma F_{Mr}$ is 360 lbs and $\mu_{mw}$ is 0.35), and defining the mass of the mobile robot ($M_p$) to be 65 lb, the payload capacity ($M_{PL}$) would be 61 lb.

Figure 11:
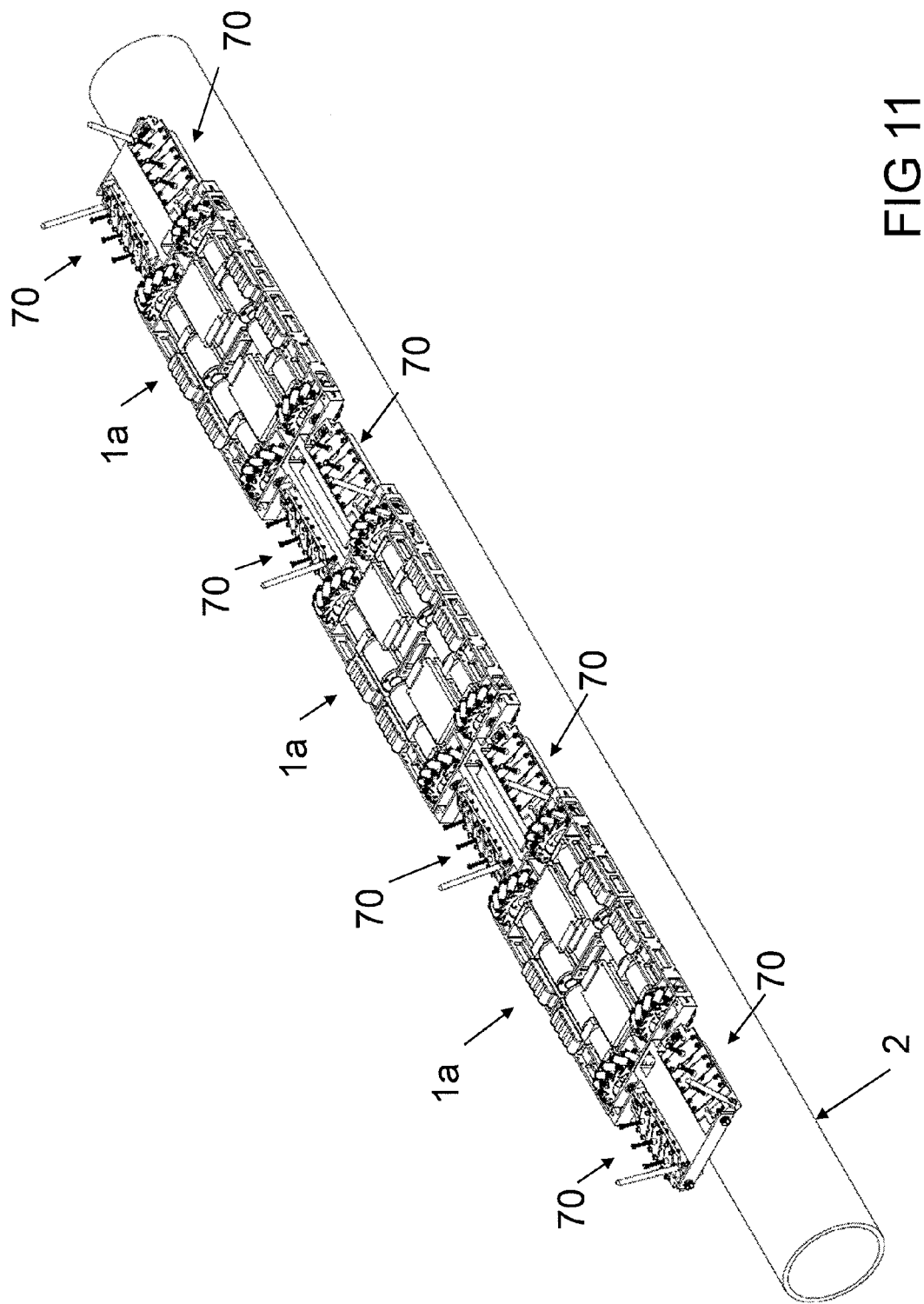
FIG. 11 is a perspective view of another mobile robot stemming from the robot of FIG. 4 in accordance with certain embodiments of the invention, showing an exemplary ganged arrangement on an object with curved surface.

With further reference to equation (1), there are various techniques that can be used to increase the lifting capacity ($M_p$) of the embodied magnetic mobile robots of the invention (such as robot 1 of FIG. 1), several of which are noted below. However, what should be appreciated is that many of these techniques are made feasible due to the magnets 50 and their orientation control structure being located external to the component units 10a, 10b of the robot 1. Some techniques of increasing the lifting capacity ($M_p$) of the robot 1 can involve increasing the magnetic force ($F_{Mreq}$). One method of doing so can involve decreasing the distance of the magnets 50 to the work surface to decrease the gap 61, thereby moving up the curve of FIG. 3 and increasing the total magnetic force of the robot 1. Another method can involve increasing the number of magnets 50. An additional method can involve joining multiple robot segments together, each with a corresponding set of magnets 50 (such as depicted in FIG. 11, as later detailed). A further method can involve using more powerful or larger magnets 50.

Other techniques of increasing lifting capacity ($M_p$) can involve increasing the coefficient of friction ($\mu_{mw}$). For example, one method of doing so can involve optimizing the material of the rollers 22 of the Mecanum wheels 20a-20d to increase such coefficient of friction. Further techniques for increasing the lifting capacity ($M_p$) of the robot 1 can involve incorporating a lift or buoyancy generating device to the robot so as to effectively reduce the total mass lifted by the robot. As alluded to above, each of the techniques for enhancing the robot's lifting capacity involves adjustment of one of the three parameters ($F_{Mreq}$, $M_p$, and $\mu_{mw}$) of equation (1) above. However, it is to be understood that any combination of the above as well as other techniques can be used to increase the payload capacity, with the techniques being simplified due to the positioning of the magnets 50 and their orientation control structure on robot 1.

Despite the above, one variable that can still affect payload capacity is material makeup of the surface that the mobile robots traverse. As previously noted, while the magnets 50 function well in supporting the mobile robots of the invention on ferromagnetic surfaces, alternative supporting capability is necessary for traversing other surface materials. For example, in certain embodiments, a non-magnetically generated force can be added to the mobile robot to work alternately or in combination with the magnets 50, depending on the work surface. As described above, such non-magnetically generated forces can involve vacuum (e.g., under the chassis 11; see FIG. 15) and/or involve pressure from a multi-segmented device encircling the work surface 2 (e.g., see embodiments described in U.S. Ser. No. 13/247,257).

As described above, mobile robots of the invention using Mecanum wheels for movement (such as the mobile robot 1 of FIG. 1) enable the robots to have capacity for moving in any direction on a work surface. To that end, Mechanum wheels represent one type of omni-directional wheels that can be used, so as to enable effective and efficient movement of the robots on a work surface. Such movement is made possible through the wheels being individually driven. For example, with regard to the Mechanum wheels 20a-20d of the robot 1 of FIGS. 1 and 2, each contains a series of the rollers 22 attached to the wheel's circumference. The rollers 22 are generally configured to have an axis of rotation offset by about 45° from a vertical plane of the wheel. As described above, in certain embodiments, each of the wheels 20a-20d can be configured with its own drive motor (or motion actuator) 30, and each of the drive motors 30 can be connected to a controller 32. In such cases, each controller 32 can communicate with a master controller 100 (with its exemplary functioning being depicted in FIG. 16), such that the wheels 20a-20d can be controlled to rotate in one of a variety of ways, such as rotating (i) in the same direction at the same speed, (ii) in the same direction differentially, (iii) in opposite directions at the same speed, or (iv) in opposite directions differentially. Via such controlled rotations, the mobile robots (and paired component units thereof) of the invention can be made to move in a variety of directions: sideways, diagonally, straight forward, or straight backward, causing corresponding change of direction for the robot 1 to be immediate and precise.

As shown in FIG. 1, wheels 20a and 20c are operably coupled to component unit 10a, and wheels 20b and 20d are operably coupled to component unit 10b. By rotating all wheels in the same direction at the same speed, the robot 1 moves in that direction at the same speed. Alternately, by rotating wheels 20c and 20d to the aft (i.e., to the robot rear), and wheels 20b and 20a to the fore (i.e., to the robot front), the robot 1 will shift laterally right edge of the paper as viewed in FIG. 1. Further, by reversing those directions, the robot 1 will shift to the left edge of the paper as viewed in FIG. 1. Finally, by rotating wheels 20b and 20c to the aft, and wheels 20a and 20d to the fore, the robot 1 will rotate in a clockwise direction. Reversing those directions will cause the robot 1 to rotate in a counterclockwise direction. Table 1 below summarizes the movement of the robot 1 with regard to such wheel actuations.

TABLE 1

| Direction of Movement | Mecanum Wheel Actuation |
|---|---|
| Rearward (Aft) | All Wheels Right Same Speed |
| Forward | All Wheels Left Same Speed |
| Right | Wheels 20c. 20d rearward: 20a. 20b forward |
| Left | Wheels 20a. 20b rearward: 20c. 20d forward |
| CW Rotate | Wheels 20c. 20b rearward: 20a. 20d forward |
| CCW Rotate | Wheels 20a. 20d rearward: 20c. 20b forward |

Thus, by individually controlling the speed and direction of motors 30 independently, the entire multi-unit robot device 1 can be made to traverse the work surface in any direction (forward, backward, laterally left, laterally right and any direction there between) in precise and immediate manner. Clockwise and counterclockwise rotation would be typically used for small adjustments only in orienting the robot 1. In certain embodiments, the total number of Mecanum wheels 20 used is divisible by four, so as to enable unbiased motion.

Figure 4:
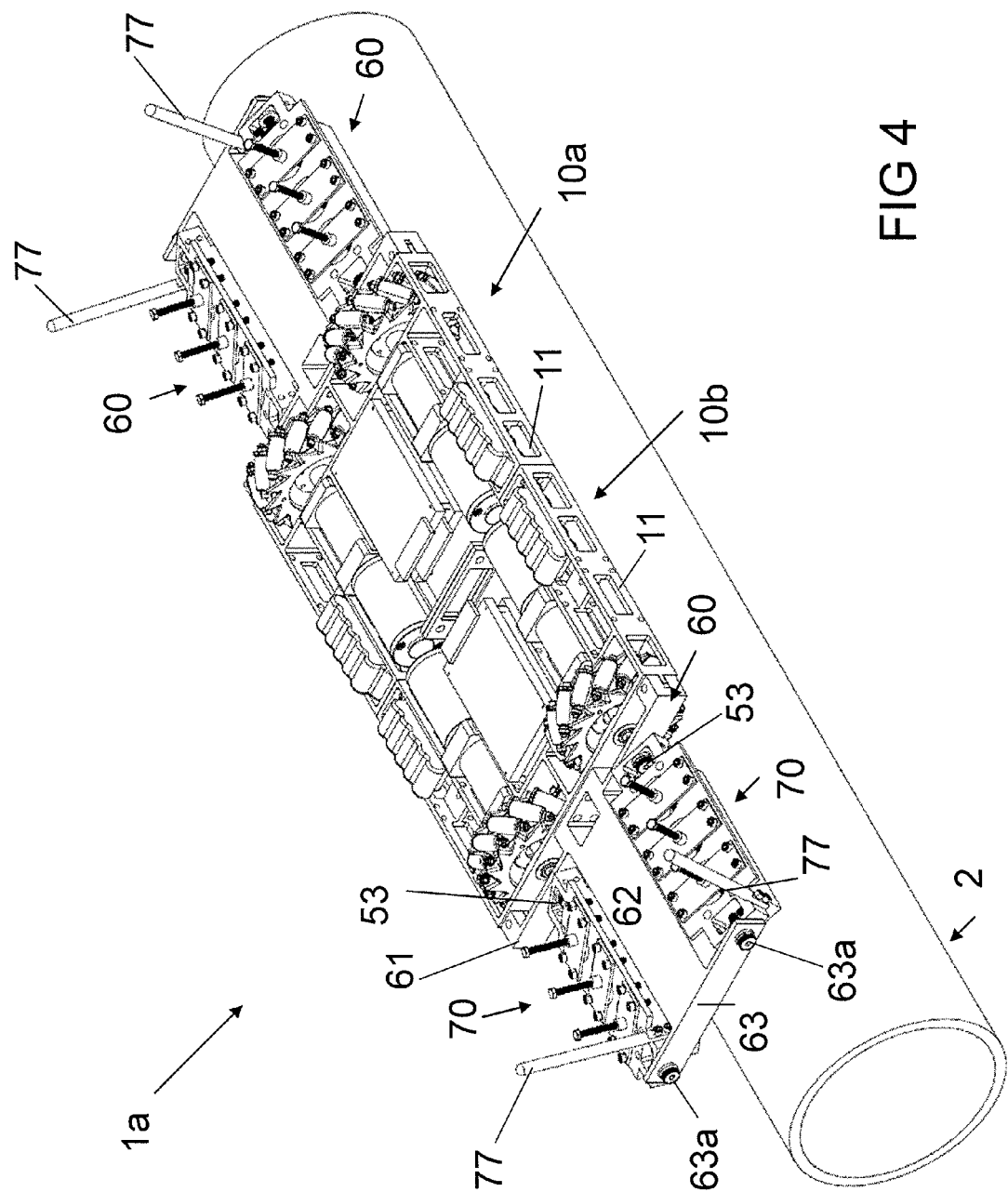
FIG. 4 is a perspective view of a mobile robot stemming from the robot of FIG. 1 in accordance with certain embodiments of the invention, including a differing magnet mount and being shown on an object with curved surface.

It is to be appreciated that alternate magnet mount designs can be used without departing from the spirit of the invention, as exemplified by mobile robot 1a of FIG. 4. The magnets 50 of the robot 1a (partially shown in FIG. 5) are used in a similar manner to those of the robot 1 of FIG. 1. For example, like the magnets 50 for mobile robot 1 of FIG. 1, the magnets 50 are operably coupled to the robot 1a so as to be held above, i.e., having no direct contact, with ferromagnetic surfaces it traverses. Yet, the field strengths of the magnets 50 are sufficient (again using above-referenced equation (1) and equation (2) derived therefrom) to hold the robot 1a and its payload against the surfaces without risk of falling therefrom.

Similar to the robot 1 of FIG. 1, in certain embodiments, the magnets 50 are operably coupled to outer ends of the robot 1a. Consequently, the magnets 50 and their orientation control structure (as embodied below) are located external to the component units 10a, 10b. As described above, this configuration has many benefits. For example, the magnets 50 and the orientation control structure can be incorporated with little to no modification being made to the design of the component units 10a, 10b. In addition, such incorporation of the magnets 50 and orientation control structure enable one or more of the robot frame's clearance from the surfaces it traverses, the robot's center of gravity, and the robot's overall profile, to be kept at a minimum.

Figure 5:
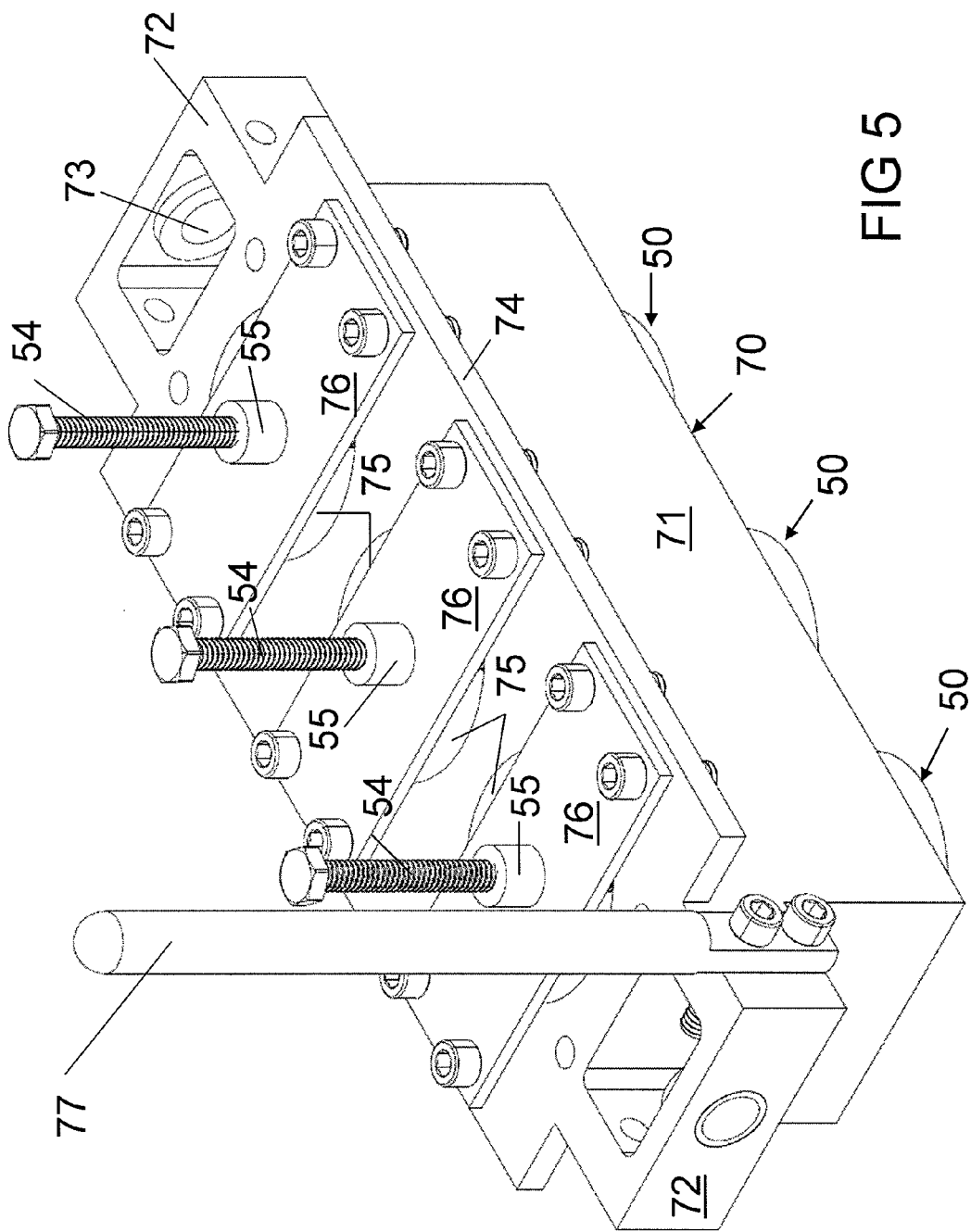
FIG. 5 is a perspective view of the magnet mount of the robot of FIG. 4.

Similar to the robot 1 of FIG. 1, in certain embodiments, the magnets 50 are operably coupled to opposing ends of the robot 1a. In particular, as shown, each magnet 50 is operatively coupled to the chassis 11 of its corresponding component unit 10a, 10b. While FIG. 5 depicts three magnets 50 being operably coupled to each of the component units 10a, 10b, it should be understood that one, two, or more than three magnet(s) could instead be used with each unit 10a, 10b. In certain embodiments, as described below, the magnets 50 are exteriorly offset from the wheels 20a-20d of the robot 1a.

The embodied structure (the orientation control structure) by which the magnets 50 are operably coupled to the mobile robot 1a is configured for working well with curved surfaces. To that end, the orientation control structure avails selective adjustment of the magnets' positioning to the curve of such surfaces. Similar to the robot 1 of FIG. 1, the orientation control structure of the robot 1a of FIG. 4 involves a plurality of components. For example, as shown in FIG. 4, each magnet 50 is operably coupled to the chassis 11 via a pivot member. To that end, the magnet pivot members 52 of robot 1 of FIG. 1 have been replaced by horizontally extending magnet pivot members 70 in robot 1a. In certain embodiments, similar to the pivot members 52 of robot 1, each pivot member 70 of robot 1a can be pivotally mounted to a pivot axle 53, which can be concentric with the axle 21 of the robot wheels and supported by a mounting bracket 60. The bracket 60 can be either integrally formed to the chassis 11, or operably coupled to the chassis 11 as shown. While the mounting bracket 60 has a base member 61, similar to mounting bracket 51 of robot 1 of FIG. 1, the bracket 60 further includes additional supporting structure. As shown, the bracket 60 can include a mounting flange 62 projecting away from base member 61 and chassis 11, terminating in a downwardly-turned flange 63. To that end, in certain embodiments, the pivot members 70 are pivotally mounted between the base member 61 and flange 63.

FIG. 5 shows an enlarged perspective view of one magnet pivot member 70 of the robot 1a of FIG. 4. As shown, each pivot member 70, generally formed as a block 71, is made of non-ferrous material. In certain embodiments, the pivot member 70 has a pair of journals 72 projecting from opposing ends thereof. To that end, each journal 72 includes an opening 73 for receiving the pivot axle 53 generally extending from mounting bracket base member 61 to bracket flange 63.

It should be appreciated that the magnets 50 can be operably coupled to the pivot member in a variety of manners. For example, with further reference to FIG. 5, the pivot member 70 can be equipped with a top plate 74, defining a plurality of openings 75, through which fasteners are passed for operably coupling same plurality of magnets 50 to the member 70. In certain embodiments, as shown, the fasteners used for each magnet 50 include an adjustment screw 54 and an adjustment nut 55, which are mounted with respect to a top plate 74. In such case, each of the adjustment screws 54 is threaded at one end in one of the magnets 50 and at the other end through one of the adjustment nuts 55, which is shown as being mounted on a magnet suspension plate 76 further mounted to the top plate 74 over one of the openings 75.

With continued reference to FIG. 5, in certain embodiments, the magnets 50 are adjustable in at least two dimensions in relation to the surface 2 on which it traverses. For example, as shown, the magnets 50 are adjustable, both in orientation angle and clearance distance in relation to the surface 2. Consequently, the magnets 50 can be adapted to a variety of surfaces, from those with irregularities across their extent to those that are non-planar, such as being curved. Regarding orientation angle, the magnets 50 of each pivot member 70 is adjustable via pivoting of the member 70 about the pivot axle 53. Regarding clearance distance (similar to the gap 61 described above with reference to robot 1 of FIG. 1), the magnets 50 are adjustable with regard to their position above the surface 2 by rotating the adjustment screws 54 in relation to the adjustment nuts 55. In certain embodiments, as shown, each pivot member 70 can include a pivot handle 77 secured to the outside end journal 72, not only easing the manner to adjust the magnets 50 in relation to the surface 2 but also easing the manner to move the robot 1a in its entirety.

Figure 6:
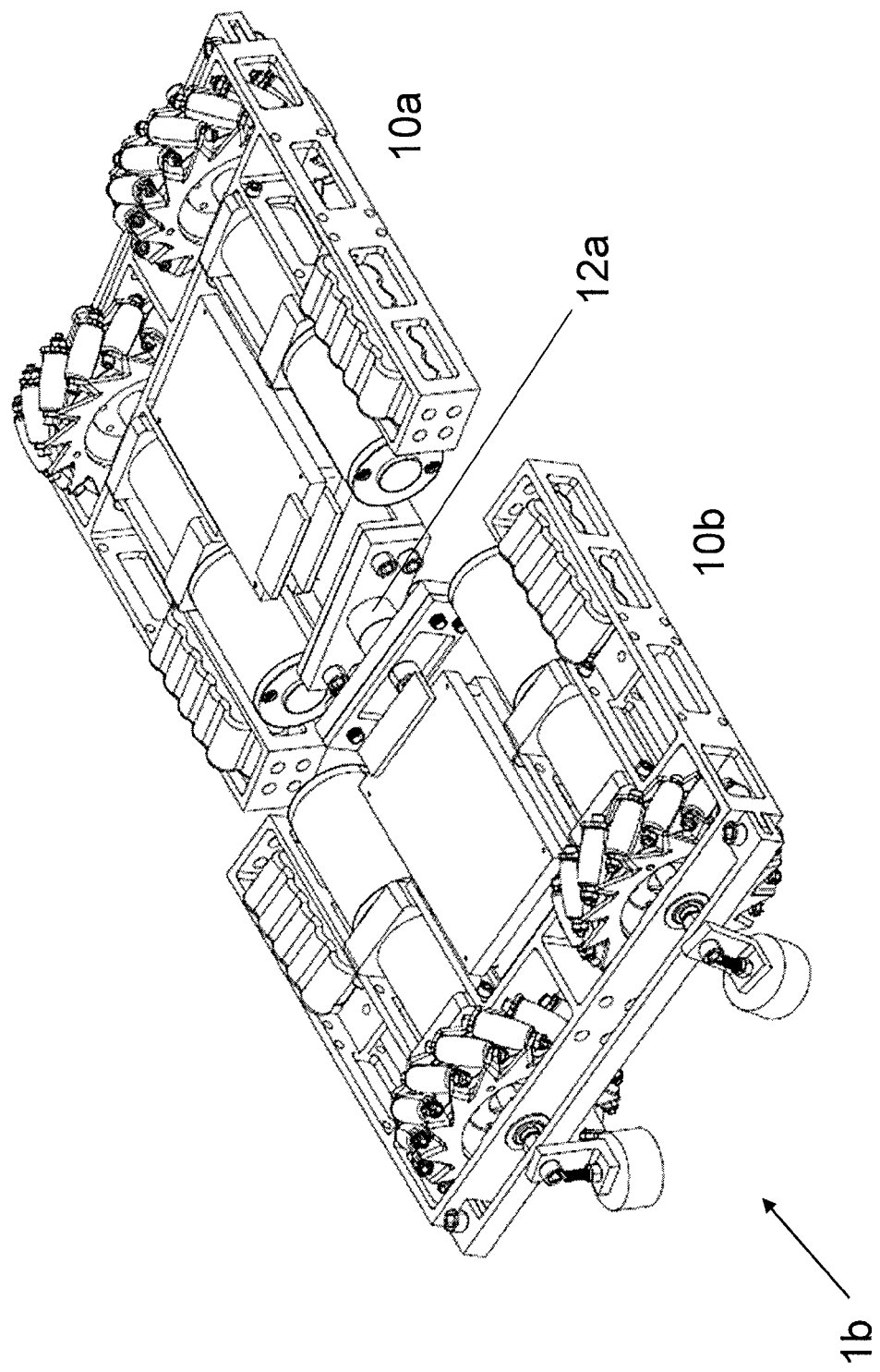
FIG. 6 is a perspective view of another mobile robot stemming from the robot of FIG. 1 in accordance with certain embodiments of the invention, wherein the component units are joined while permitting the units to be adjusted in relation to each other.

FIGS. 6 and 7 illustrate further alternative mobile robots 1b and 1c, respectively, in accordance with certain embodiments of the invention. The robots 1b and 1c respectively include component units 10a and 10b and 10a' and 10b', yet the units are not locked with a coupling connector (such as threaded couplings 12 of robot 1 of FIG. 1). Instead, the units 10a, 10b and 10a', 10b' are joined by one or more linkages to permit shifting of the joined units in relation to each other. In certain embodiments, as perhaps more clearly shown in FIG. 6, the one or more linkages involve a single pivot or swivel joint coupling 12a; however, the invention should not be limited to such as a wide variety of other like-functioning linkages can just as well be used in the alternative.

However, in using the joint coupling 12a as defining the one or more linkages, at least some initial characteristics can be noted in its use with the robots 1b and 1c. For example, in certain embodiments, the one or more linkages are located external to the component units (units 10a and 10b of robot 1b, and units 10a' and 10b' of robot 1c). Additionally, in certain embodiments, the one or more linkages are operably coupled to outer sides of two of the component units. Also, in certain embodiments, the one or more linkages are located along a midline of the robots 10b and 10c, but apart from wheel axles 21 of the robots.

In using the joint coupling 12a as the one or more linkages, the joined component units (units 10a and 10b of robot 1b, and units 10a' and 10b' of robot 1c) are configured for at least pivoting one of the component units in relation to the other component unit. Thus, the joined component units 10a and 10b, 10a' and 10b' are enabled to shift by a single degree of freedom. As previously described, using one or more such linkages in joining the component units allows the units to shift (relative to each other) to better accommodate irregular surfaces over which mobile robots of the invention can be used. However, as alluded to above, other linkages could be used to enable more than one degree of freedom being achieved for the units 10a', 10b'. In certain embodiments, such linkage can also be also used with the Mecanum wheels to maintain their contact with cylindrical surface 2 if there is any yaw component.

Continuing with reference to the robot 1c of FIG. 7, several other exemplary features are shown. For example, the frames (or chasses) 11 for each of the units 10a' and 10b' can be covered to protect internal components from an outdoor environment. Further, whether used separately or in combination, the units 10a' and 10b' can include generic payload mounts 13 for carrying objects on the frames 11. In certain embodiments, additional Mecanum wheels 20a', 20b', 20c', and 20d' can be added to the units for better distribution of the forces generated by the magnets 50. Finally, in certain embodiments, robot 1c also includes further wheels 14 and handles 15 attached to mounting flange 62' to allow the robot 1c to be transported like a hand cart. In such cases, the wheels 14, as shown, can be mounted so as to not extend below the Mecanum wheels (toward the surface traversed by the robot 1c). As such, there is no interference or friction created by the wheels 14 contacting the working surface when the robot 1c is used. As further illustrated, the magnet brackets 62' (e.g., locked to the units 10a', 10b by removable pins 16) are configured to be removable from the robot 1c. By removing the pins 16, the brackets 62' can be removed for robot c storage and transport.

Figure 8:
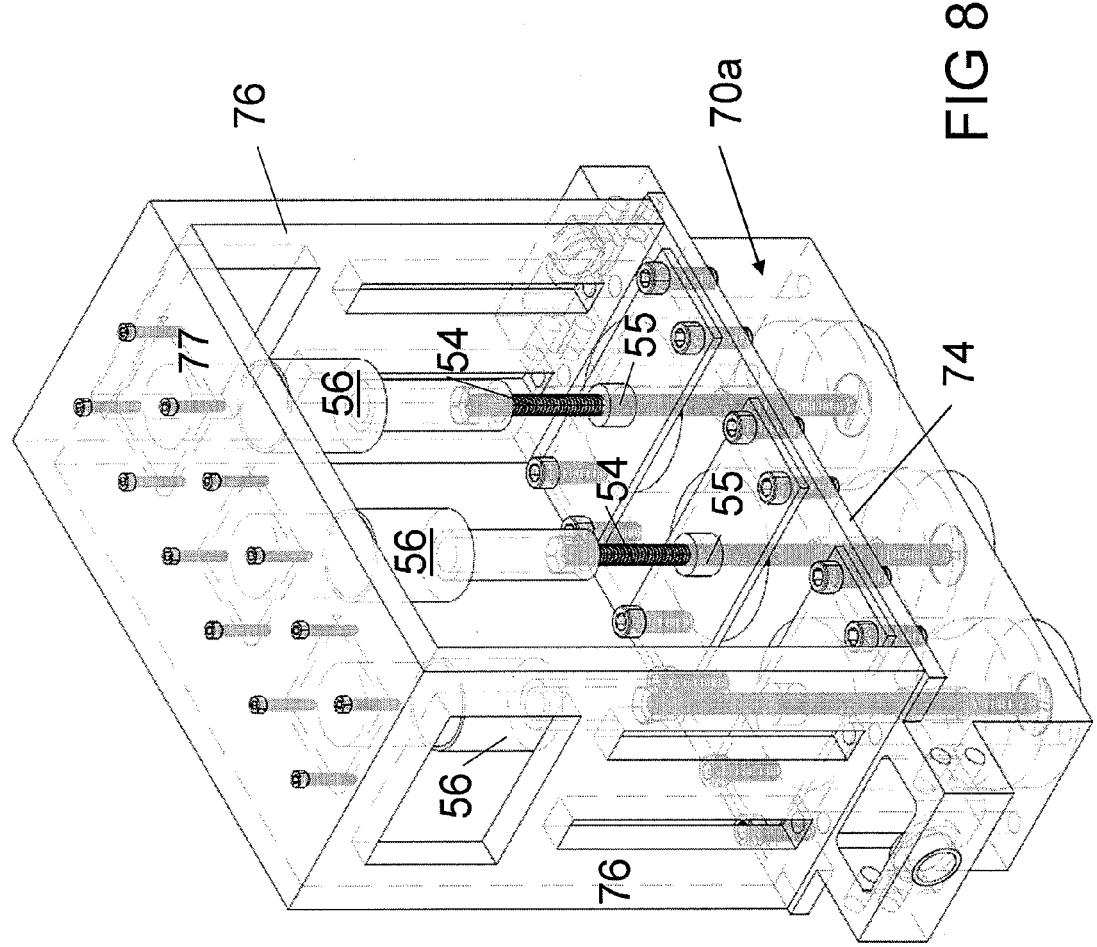
FIG. 8 is a perspective view of a magnet mount stemming from the mount of FIG. 5 in accordance with certain embodiments of the invention.

FIG. 8 shows an additional alternative pivot member 70a in accordance with certain embodiments of the invention. Similar to the pivot member 70 of FIGS. 4 and 5, the pivot member 70a includes the same threaded adjustment screws 54; however, the screws 54 are secured to and rotatably driven by adjustment motors 56. In certain embodiments, the motors 56 can be secured to a base member 77 of an inverted U-shaped structure, with its legs 76 being secured to the top plate 74 of the pivot member 70a. In such cases, the motors 56 can be adjustment screw motors (as opposed to conventional stepper motors) to allow for precise control of the heights of the magnets 50 above the surface traversed by the corresponding mobile robot.

Figure 9:
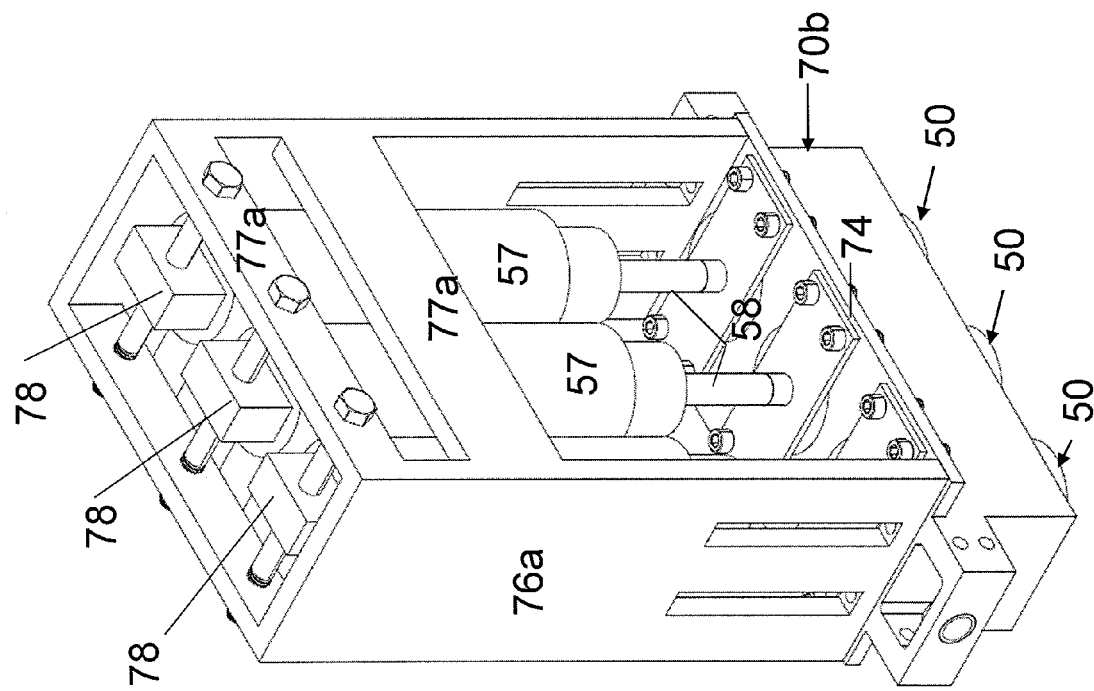
FIG. 9 is a perspective view of a magnet mount stemming from the mounts of FIGS. 5 and 8 in accordance with certain embodiments of the invention.

Similar to FIG. 8, FIG. 9 illustrates another alternative pivot member 70b in accordance with certain embodiments of the invention. As shown, distinct from the pivot member 70a of FIG. 8, the legs 76a of the U-shaped structure can be joined by cross members 77a rather than a top plate 77. In addition, the adjustment rods 54 can be replaced by pneumatic or hydraulic cylinders 57 suspended between the cross members 77a (e.g., via suspension bolts 78 extending there between). In such case of using pneumatic or hydraulic cylinders 57, their piston rods 58 are secured directly to the magnets 50. Consequently, the heights of the magnets 50 can be adjusted pneumatically or hydraulically. This can be found beneficial, particularly if the pistons 78 are spring biased downwardly. For example, in that event, if a control system (not shown) of the mobile robot detects that the robot is in danger of falling off of the ferromagnetic surface it is traversing, the control system can send a signal to trigger cylinders 57 to extend cylinder rods 58 downwardly as far as possible such that the magnets 50 directly engage the ferromagnetic surface, thereby maximizing holding power.

Figure 10:
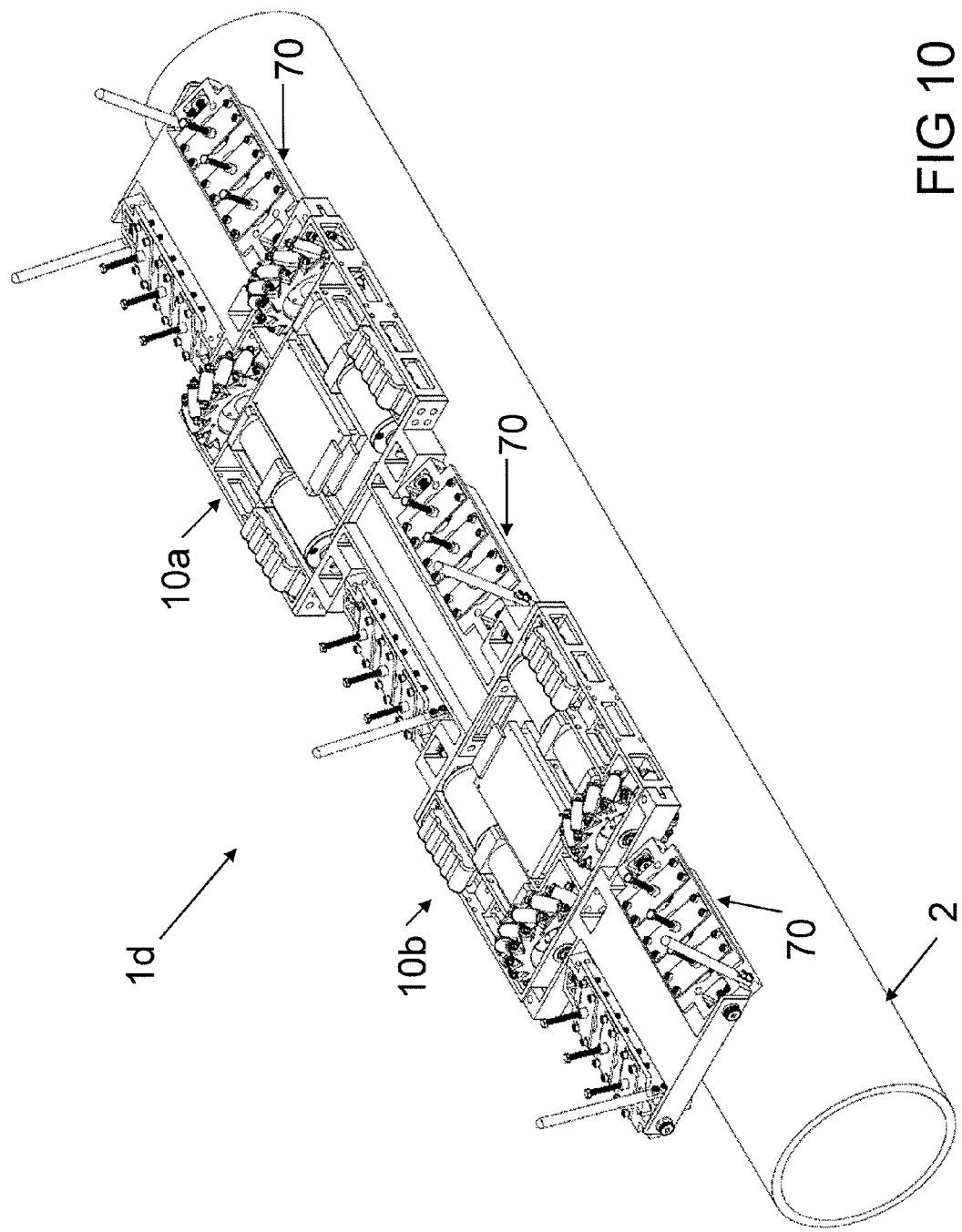
FIG. 10 is a perspective view of a mobile robot stemming from the robot of FIG. 4 in accordance with certain embodiments of the invention, shown on an object with curved surface.

FIGS. 10 and 11 show further alternative mobile robots 1d and 1e in accordance with certain embodiments of the invention. Robot 1d, which is similar to mobile robot 1a of FIG. 4, includes an additional pair of magnet pivot members 70 interposed between robot component units 10a and 10b. Such construction enables the magnet holding power afforded to mobile robot 1d to be enhanced. It should be appreciated that this form of ganging technique could be further employed by continuing to add more alternating units 10a and 10b, separated from one another by pivot mounting members 70. Regarding ganging embodiments, FIG. 11 illustrates a configuration that closely resembles mobile robot 1a of FIG. 4. To that end, FIG. 11 shows adjacent robots 1a sharing the pivot members 70 disposed between them. Ganging of robots is shown in only one axis, but ganging can also be performed in a generally perpendicular axis along the surface 2, for example, by connecting the sides segments 10a and 10b by a pivot or other joint coupling, such as later described and shown in FIG. 12.

Each mobile robot of embodiments of the present invention, or each component unit (units 10a, 10b of FIG. 1) thereof, can be utilized for a number of applications. For example, one exemplary set of applications can involve carrying a desired payload. The payload could be a spray painting device, cleaning device, cutting device, welding device, inspection device, or other servicing device so that the mobile robot can use such devices to clean, paint, inspect, or perform other maintenance on a surface. When the robots are configured for traversing ferromagnetic surfaces, objects having these types of surfaces could include pipelines, towers, ship hulls, field erected tanks, beams, and other infrastructure. For tower applications, the payload could be a crane device which the robot would transport to the desired location on a tower, for use in raising, lowering and manipulating other equipment. In certain embodiments, more sophisticated payloads may require remote manipulation of objects about the mobile robot 1. In such cases, the robots can be configured with one or more handling devices, such as robotic arms, for carrying out such tasks.

Figure 12:
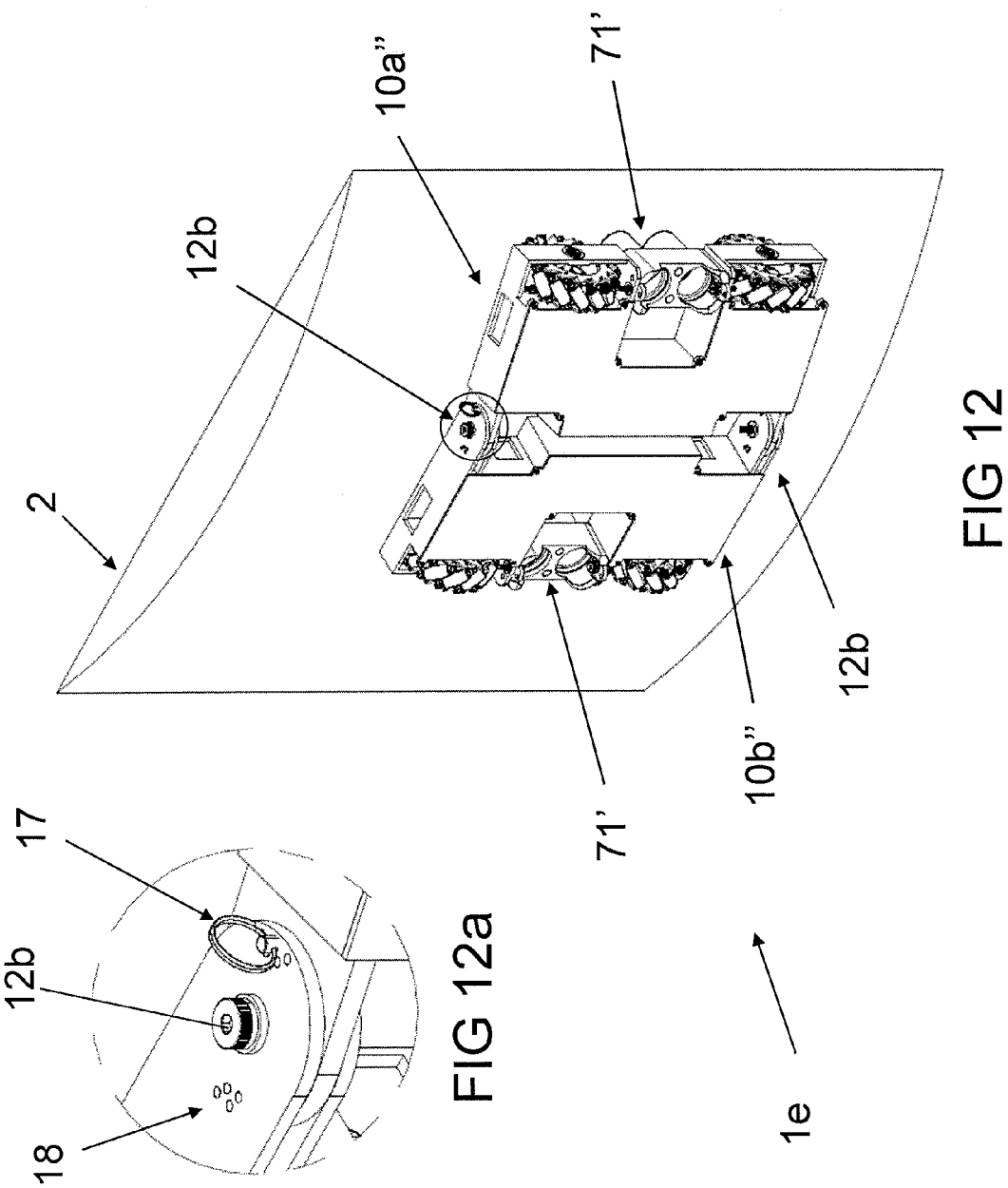
FIG. 12 is a perspective view of an additional mobile robot stemming from the robot of FIG. 1 in accordance with certain embodiments of the invention, shown on an object with curved surface and wherein the component units are joined while permitting the units to be adjusted in relation to each other.

FIG. 12 illustrates an additional alternative mobile robot 1e in accordance with certain embodiments of the invention. Similar to the robots 1b of FIG. 6 and 1c of FIG. 7, the robot 1e of FIG. 12 has one degree of freedom (e.g., pivoting) about joint coupling 12b that allows the component units 10a" and 10b" to shift in relation to each other. However, by coupling the units 10a" and 10b" at two points (top and bottom corners of facing surfaces of the units), the joint coupling 12b is even more effective in keeping the Mecanum wheels 20 perpendicular to and in flush contact with the surface 2. As a result, the robot 1e can climb a curved surface (such as surface 2) with all Mecanum wheels turning in the same direction in smooth fashion. In certain embodiments, as perhaps most clearly shown in FIG. 12a, the joint coupling 12b is held by a pin 17 through angle set holes 18. Alternatively, for example, the pivot 12b can be automatically adjusted with the addition of a stepper motor and threaded rod arrangement similar to that shown in FIG. 8, such that removal of pin 17 is precisely provided to control the pivot angle. As shown, the robot 1e, in certain embodiments, includes magnet holding brackets 71'. As shown, while these brackets 71' are operably coupled to ends of the robot 1e, they allow for fixed magnet positioning if adjustability of the magnets is not required. However, it should be appreciated that pivot members (such as member 52 of robot 1 of FIG. 1 or member 70 of FIG. 4) could be employed with robot 1e.

As described above, in certain embodiments, mobile robots of the invention use Mecanum wheels to achieve pure omnidirectional movement. However, other types of wheels or tracks can be alternately used as long as the requirements of equation (1) are met at the expense of pure omnidirectional movement. For example, such other types of wheels could include conventional axis wheels 23a-d (as exemplified in FIG. 13) or pivotable caster wheels to allow some degree of omnidirectional movement. On the other hand, if enhanced traction is dictated, the Mecanum wheels 20a-d or conventional axis wheels 23a-d may be replaced with tracks 24a-d (as exemplified in FIG. 14).

Figure 13:
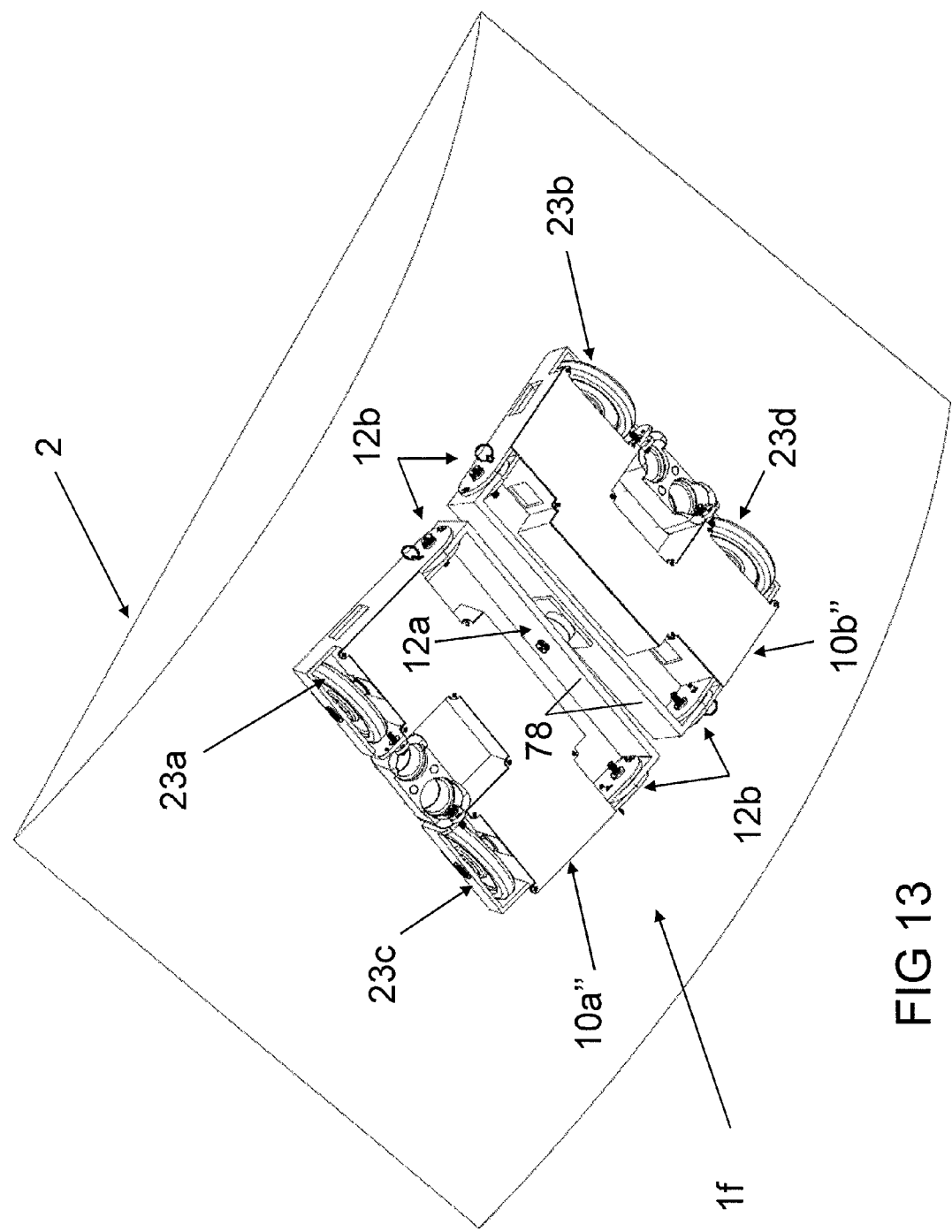
FIG. 13 is a perspective view of a mobile robot stemming from the robots of FIGS. 6 and 12 in accordance with certain embodiments of the invention, shown on an object with curved surface.

With further reference to FIG. 13, it shows another alternative mobile robot 1f in accordance with certain embodiments of the invention. To this point, joint couplings used with the mobile robots have been described as providing a single degree of freedom in shifting the component units in relation to each other. However, with respect to robot 1f, multiple linkages (e.g., joint couplings 12a and 12b) are exemplified, which via their combined use, enables dual degrees of freedom, each of which stem from facing sides 78 of the frames of the component units 10a", 10b". One purpose in combining these joint couplings is to provide robot 1f with the degrees of freedom required to operate favorably on slight and severely irregular surfaces. As noted above, the robot 1f of FIG. 13 is exemplarily shown with conventional axis wheels 23a-d in place of Mecanum wheels. However, some clockwise and counterclockwise maneuverability is made possible for the robot 1f given the dual degrees of freedom. For example, by rotating all wheels in the same direction at the same speed, the robot units 10a", 10b" move in that direction at the same speed. Additionally, by rotating wheels 20d and 20b to the rear, and wheels 20a and 20c to the front, the units 10a", 10b" will rotate in a clockwise direction. Alternatively, reversing those directions will cause the units 10a", 10b" to rotate in a counterclockwise direction. Table 2 below summarizes the movement of the robot 1f with regard to such wheel actuations.

TABLE 2

| Direction of Movement | Standard Wheel Actuation |
| --- | --- |
| Rearward (Aft) | All Wheels Rearward Same Speed |
| Forward | All Wheels Forward Same Speed |
| CW Rotate | Wheels 20d. 20b Rearward: 20c. 20a Forward |
| CCW Rotate | Wheels 20a. 20c Rearward: 20d. 20b Forward |

Figure 14:
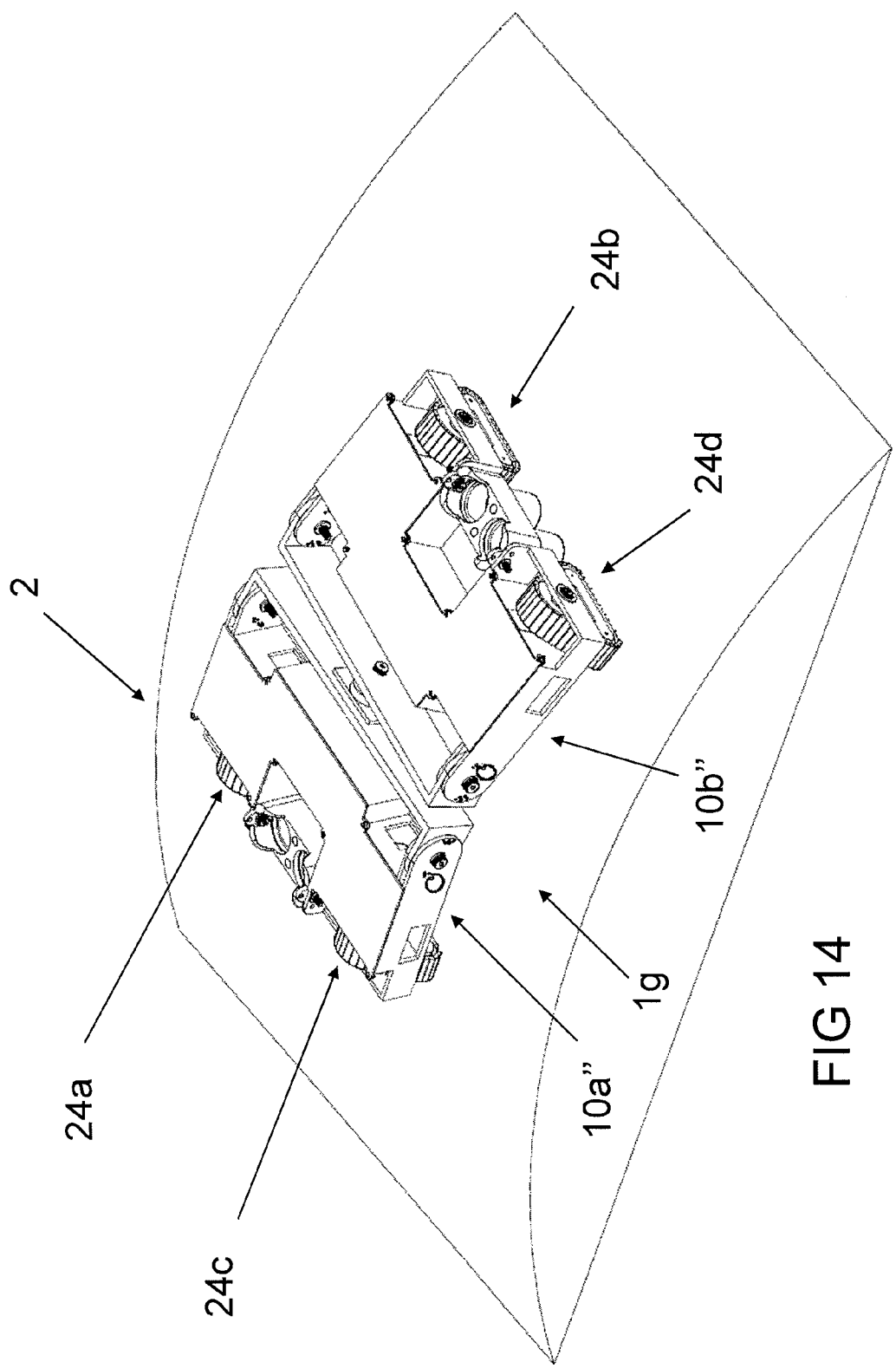
FIG. 14 is a perspective view of a mobile robot stemming from the robot of FIG. 13 in accordance with certain embodiments of the invention, shown on an object with curved surface.

FIG. 14 illustrates additional alternative mobile robot 1g in accordance with certain embodiments of the invention. Robot 1g includes the same configuration of the robot 1f of FIG. 13; however, as noted above, the robot 1g is exemplarily shown with the conventional axis wheels 23a-d (shown in robot 1f of FIG. 13) having been replaced with tracks 24a-d. Similar to the conventional wheels, limited clockwise and counterclockwise maneuverability is possible given the dual pivot degrees of freedom from the multiple linkages of the component units 10a", 10b". By actuating all tracks in the same direction at the same speed, the robot units 10a", 10b" move in that direction at the same speed. By actuating tracks 24d and 24b to the rear, and tracks 24a and 24c to the front, the units 10a", 10b" will rotate in a clockwise direction. Reversing those directions will cause the units 10a", 10b" to rotate in a counterclockwise direction. Table 3 below summarizes the movement of the robot 1g with regard to such wheel actuations.

TABLE 3

| Direction of Movement | Track Actuation |
| --- | --- |
| Rearward (Aft) | All Tracks Rearward Same Speed |
| Forward | All Tracks Forward Same Speed |

TABLE 3-continued

| Direction of Movement | Track Actuation |
|---|---|
| CW Rotate | Tracks 20d. 20b Rearward: 20c. 20a Forward |
| CCW Rotate | Tracks 20a. 20c Rearward: 20d. 20b Forward |

Figure 15:
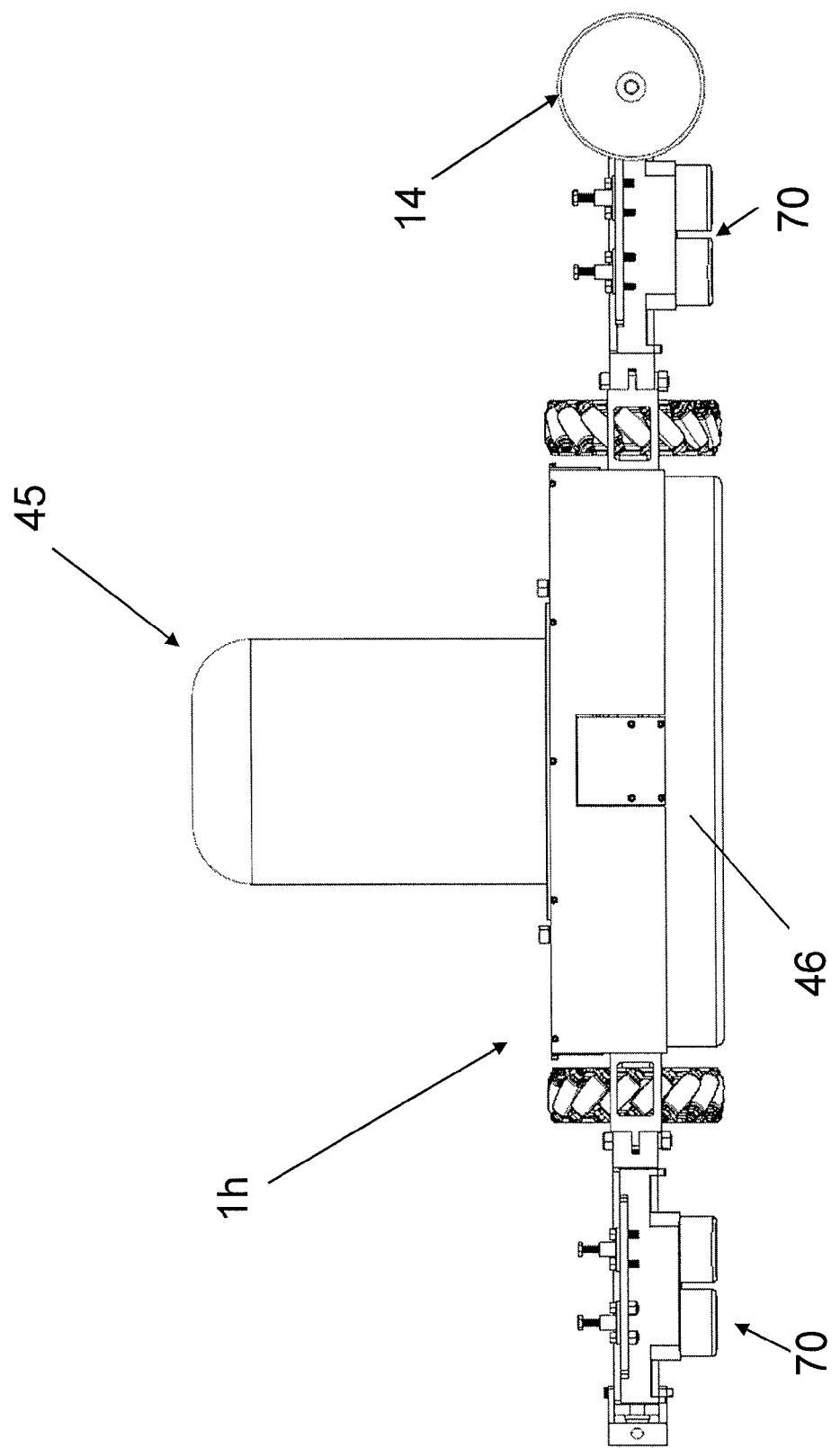
FIG. 15 is an elevation view of an additional mobile robot stemming from the robot of FIG. 4 in accordance with certain embodiments of the invention.

FIG. 15 shows further alternative mobile robot 1h in accordance with certain embodiments of the invention. Robot 1h includes the same configuration of the robot 1a of FIG. 4; however, the magnetic force therefrom is shown as being augmented by use of vacuum device 45. As shown, in certain embodiments, the vacuum created from such device 45 is maintained by a skirt 46 where the internal pressure is less than external ambient pressure. Consequently, the vacuum provides a net force (that is movable across surface traversed by robot via action of the wheels, e.g., Mecanum wheels 20a-) similar to that generated by magnets 50. It should be understood that while a vacuum may be part of the overall payload where it is required to remove debris, such as a sand blasting application, as the vacuum can serves to augment the holding force applied to the robot wheels in addition to the primary role of removing debris. If vacuum 45 is sufficiently strong enough to ensure the requirements of equation (1) are met, the magnets 50 are not required for mobile robots of the invention. It is to be appreciated that in such scenarios, the work surface needs not be ferrous, but instead only sufficiently smooth to allow the skirt 46 to maintain sufficient vacuum.

In certain embodiments, each mobile robot 1-1h embodied herein, or each component unit thereof, may include quick connect/disconnect interfaces, e.g., for electrical power, control communications, pneumatic/hydraulic lines for use by payload and robot, if required, and application liquid lines for use by payload, if required. Additionally, in certain embodiments, each component unit of the embodied robots can be made to a size which provides room to install all equipment necessary to make it and the payload self-contained (e.g. batteries, tanks, wireless communication, etc.). This would be desirable if the robot needs to navigate around supporting structure or large obstacles that make power/control lines impractical (e.g. pipeline supports).

Figure 16:
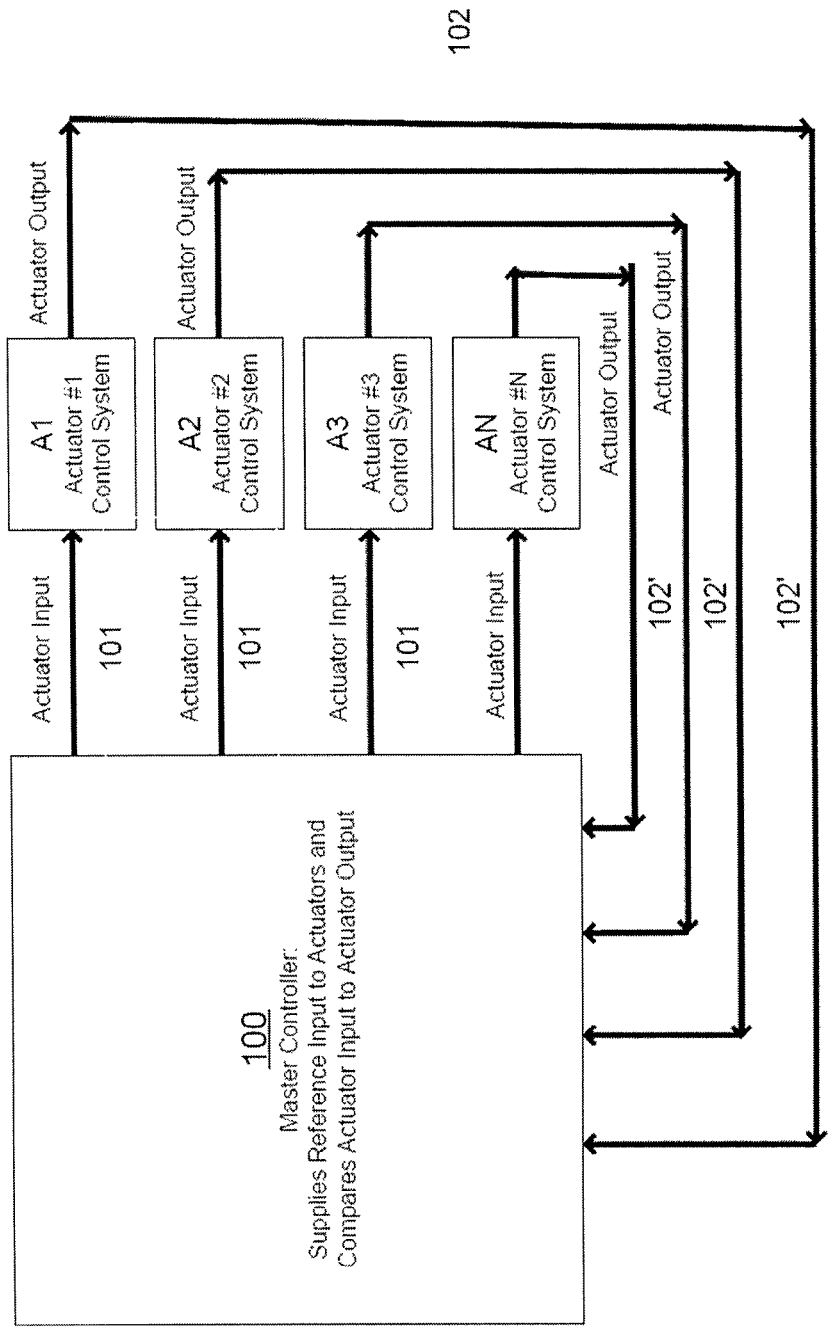
FIG. 16 is a master control diagram for the embodied mobile robots in accordance with certain embodiments of the invention.

The mobile robots of the invention, in any of their various embodiments, can be controlled through a "master controller" computer 100, an exemplary master control diagram for which is provided in FIG. 16 in accordance with certain embodiments of the invention. Whether using Mecanum wheels 20a-20d, conventional axis wheels 23a-23d, or tracks 24a-24d, such are independently controlled to achieve the desired movement on the object that the robot is traversing. In certain embodiments, such control can also be provided for operable payload devices carried by the robot. Thus, the master controller computer 100 can be configured to independently direct a plurality of individual actuator controls A1, A2, A3, . . . , AN (e.g. motor controller 32), depending on the quantity needed to control all of the wheels (or tracks and operable payload members) mounted on the robot, or robots if they are ganged together (such as exemplified in FIG. 11). The controller computer 100, in certain embodiments, is independently wired to each of the actuator controls in each of the robots; however, the invention should not be limited to such, as the controller computer 100 could alternately control each actuator control through wireless communications.

Figure 17:
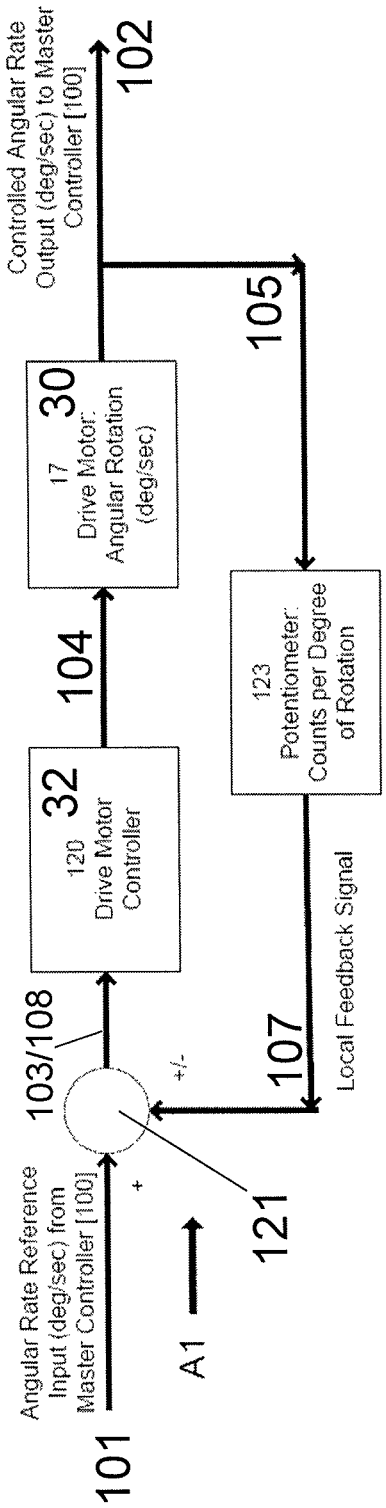
FIG. 17 is a control diagram for motor control system input for the embodied mobile robots in accordance with certain embodiments of the invention.

FIG. 17 is a control diagram for motor control system input for the embodied mobile robots in accordance with certain embodiments of the invention. To begin, actuator input from the master controller computer 100 is individually directed as indicated by control lines 101 to each actuator control A1, A2, A3, . . . , AN, such as motor controller 32, located on the robot or robots. The actuator control, as shown, processes the information and directs an actuator, e.g. a motor 30, to perform a desired function. The so-directed actuator then provides feedback information to the actuator control, which in turn feeds it back to the master controller computer 100, as indicated by one or more feedback lines 102. It should be appreciated that lines 101 and 102 can involve wireless lines of communication as well as wired lines.

FIG. 17, in particular, is an exemplary schematic of actuator control system A1, which controls a wheel or track drive motor 30. As shown, the master controller 100 sends angular rate instructions to a motor controller 32, as indicated by line 101. This signal passes through a summing point 121 and on to the motor controller 32, which in turn passes these instructions on to motor 30 via line 104. The motor 30 provides an output signal which is fed back to the master controller 100, and can be fed to a potentiometer/encoder 123 via communication line 105. In such case, the potentiometer/encoder 123 measures the rate of rotation of motor 30, and sends the resulting signal to the summing point 121 via communication line 107. The resultant feedback signal is communicated to the motor controller 32 via communication line 108. The motor controller 32, in turn, compares the two inputs and can send a blended resultant signal via line 104 to wheel or track drive motor 30.

With reference, for example, to a process involving instructions for a surface to be cleaned, painted or otherwise treated, instructions can be loaded into the computer/controller 100 in a program similar to a CNC machining program. The controller 100 then instructs the mobile robot, through various actuator control systems A1-AN, on how to move to a specific location or cover the surface completely. The computer can determine the starting point of robot by the configuration of the robot at whatever point from which it starts on the work surface. Alternately, if automated control is not required, the mobile robot can be manually controlled by an operator.

Alternatively or in combination, location control can be based on an external reference source. For example, the reference source could relay global position of specific point(s) of reference on the robot or ganged robots, to the master controller 100. By comparing the external position references to the robot position(s), the controller 100 would be able to process an accurate position reference for the robot or each ganged robot, or robot unit components. There are several methods of external control possible, with one common method involving GPS or a ground transmitter being located in a known position.

Figure 18:
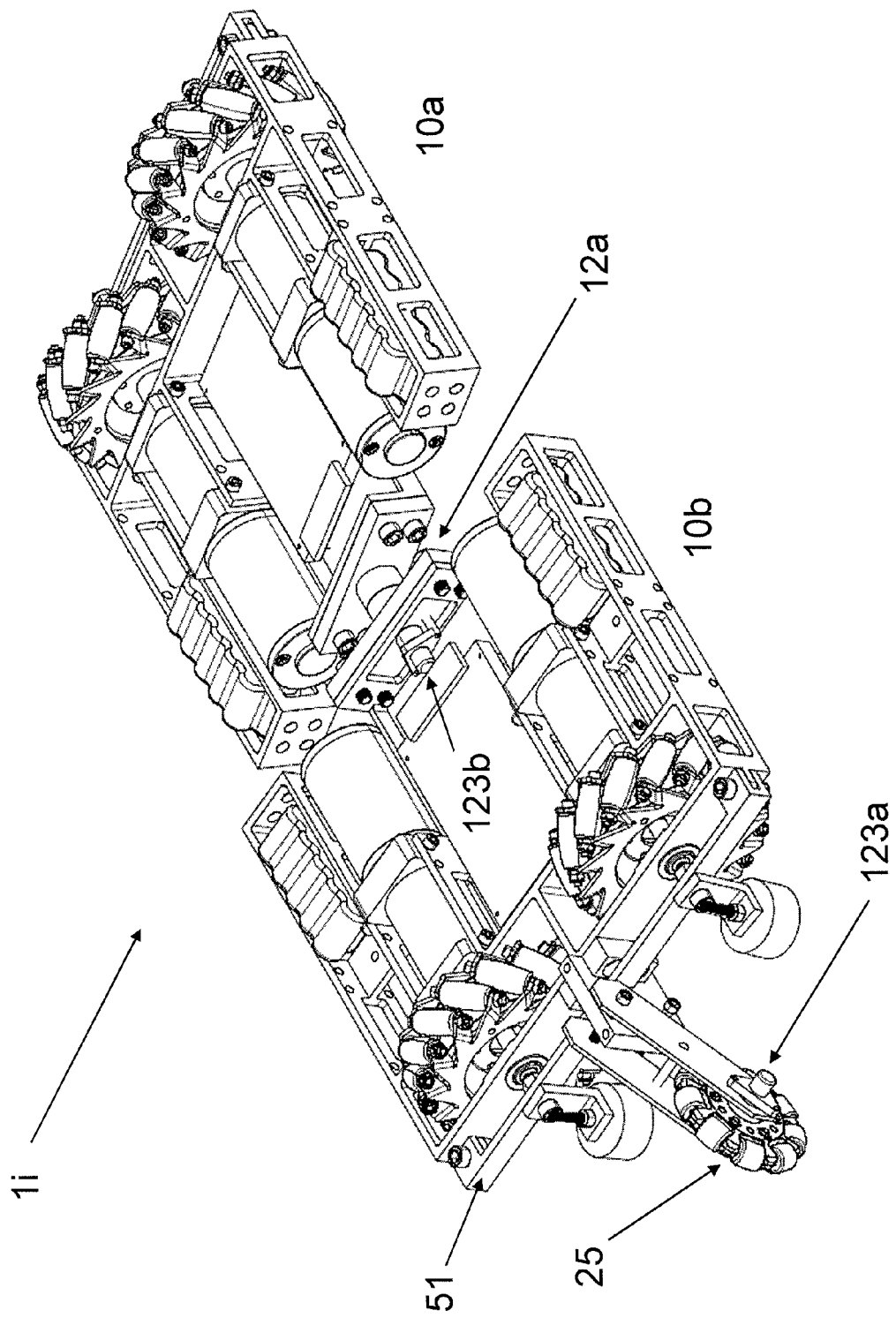
FIG. 18 is a perspective view of a mobile robot stemming from the robot of FIG. 6 in accordance with certain embodiments of the invention.

In certain embodiments, position and/or orientation of the robot can be determined by feedback from a wide array of sources (e.g. pitch and yaw angle sensors, GPS, accelerometers, coasting encoder wheels, known position transmitter, drive motor rates, inertial guidance control, etc.). As should be appreciated, precise position and orientation control allows for minimal user input, and thus facilitates automation of a particular task. The robot will relay relevant position data to the payload as required. FIG. 18 illustrates an exemplary mobile robot 1i having features for enabling certain of these functions in accordance with certain embodiments of the invention. Similar in many respects to the robot 1b of FIG. 4, the robot 1i has further features including omni wheel 25, omni-wheel encoder 123a, and joint coupling encoder 123b. In certain embodiments, as shown, the omni wheel 25 is pivotally coupled to the magnet mounting bracket 51 so as to freely contact and rotate on the work surface that the robot 1i traverses. As further shown, in certain embodiments, the wheel encoder 123a is coupled to the axle of the wheel 25, while the joint coupling encoder 123b is coupled to one end of the joint coupling 12a between the component units 10a, 10b.

With continued reference to FIG. 18, via monitoring of the velocity and position of the wheel 25, the wheel encoder 123a transmits such information to the master controller 100 (not visibly shown but located on one of the component units 10a, 10b). With this information, the controller 100, among other things, is able to track true position of the robot 1i on the work surface. Similarly, the joint coupling encoder 123b can monitor angle difference between the component units 10a, 10b and transmit such information to the master controller 100. It should be appreciated that the greater the angle difference, the more off axis the robot 1i is in relation to the working surface. This is particularly relevant with curved working surfaces. As some amount of wheel slip is inherent in Mecanum drive systems, in certain embodiments, feedback in addition to Mecanum wheel rates as supplied to the master controller 100 can allow for precise control of robot 1i orientation and accurate navigation. To that end, the controller 100 can correct for any slipping as the robot 1i moves along the surface via control of the various actuator control systems A1-AN. Slip is less of an issue for conventional axis wheel or track drive systems, but for precise control, master controller 100 would still require feedback.

The robots of the preferred embodiments have many uses, one of which is servicing cylindrical towers, such as wind turbine towers or vertical pipe. The configuration of the tower, such as location of protruding obstacles and other general "keep-out" zones, can be loaded into the computer/controller 100 in a program similar to a CNC machining program. In turn, computer/controller 100 can compare the configuration of mobile robot to the configuration of the tower to determine the starting position of robot. In use, the mobile robot may be placed on any ferrous surface and surface geometry provided to the controller 100. In certain embodiments, as alluded to above, an onboard GPS or other navigation device can be used to communicate position and orientation information to the computer/controller 100. The computer/controller 100 then instructs the mobile robot, through various actuator control systems A1-AN, on how to move in order to proceed to and on the surface, so as to cover the surface completely or move directly to a particular location thereon. As described above, the mobile robot can carry cleaning, painting, cutting, welding, and/or other servicing equipment, which the computer/controller 100 can instruct the robot to both prepare and then service the work surface.

It should be understood that the foregoing is a description of preferred embodiments of the invention, and various changes and alterations can be made without departing from the spirit of the invention.

What is claimed is:

1. A mobile robot configured to be used on a surface while having capability to move to all areas on the surface in direct and expedient manner, the mobile robot comprising:
 a framework configured to be held against the surface regardless of the surface's orientation to ground or floor; and
 at least four omni-directional wheels operably joined to the framework, the wheels generally positioned proximate to four separate corners of the robot, rotation of the wheels being independently controlled so that all are rotated without change in orientation relative to the framework, the wheels being rotated either forward or back to accommodate movement of the robot in forward, backward, right, left, clockwise, and counterclockwise directions while generally remaining in contact with the surface.

2. The mobile robot of claim 1 wherein the surface is of an object having one or more portions angled from the ground or floor.

3. The mobile robot of claim 2 wherein the object is a wind turbine tower.

4. The mobile robot of claim 1 wherein the omni-directional wheels are Mecanum wheels.

5. The mobile robot of claim 4 wherein rotation of each of the Mecanum wheels results from a master controller.

6. The mobile robot of claim 5 wherein the master controller controls individual controllers, each controlling the rotation of a corresponding one of the Mecanum wheels.

7. The mobile robot of claim 1 wherein the framework comprises one or more pairs of component units, wherein each of the component units is an integral assembly and has a frame surrounding the assembly, and wherein the component units of each pair are operably joined in a side-by-side manner.

8. The mobile robot of claim 1, further comprising a plurality of magnets, wherein the surface is formed of a ferromagnetic material and wherein the magnets are operably coupled to the framework and held a distance above the ferromagnetic surface yet have field strengths sufficient to hold the robot and payload thereof against the surface.

9. The mobile robot of claim 8, wherein the plurality of magnets includes at least a first set of magnets, and wherein certain of the first set of magnets are operably coupled to one end of the framework, and remainder of the first set of magnets are operably coupled to an opposing end of the framework.

10. The mobile robot of claim 8 wherein the magnets are selectively adjustable in two or more dimensions in relation to the ferromagnetic surface.

11. The mobile robot of claim 10 wherein the magnets are selectively adjustable with regard to angle and clearance in relation to the ferromagnetic surface.

12. The mobile robot of claim 8 wherein the magnets are operably coupled to the framework via orientation control structure, the orientation control structure comprising a plurality of pivot members.

13. The mobile robot of claim 7 wherein the frames of the component units of each pair are operably joined via one or more component couplings.

14. The mobile robot of claim 13 wherein the joined component units are locked in relation to each other via the component couplings.

15. The mobile robot of claim 13 wherein one or more of the component couplings comprise linkages, wherein the linkages are configured to permit the joined component units to shift in relation to each other so that contact between the robot and the ferromagnetic surface is maintained.

16. The mobile robot of claim 15 wherein the joined component units are enabled to shift in relation to each other in more than one degree of freedom.

17. The mobile robot of claim 15 wherein one of the degrees of freedom involves the joined component units being able to pivot in relation to each other.

18. The mobile robot of claim 7 further comprising a plurality of magnets, wherein the surface is formed of a ferromagnetic material and wherein the magnets are operably coupled to outer ends of certain of the component units and held a distance above the ferromagnetic surface yet have field strengths sufficient to hold the robot and payload thereof against the surface.

* * * * *